US010753647B2

(12) United States Patent
Gardner et al.

(10) Patent No.: US 10,753,647 B2
(45) Date of Patent: Aug. 25, 2020

(54) INTEGRATED LEAK DETECTION SYSTEM FOR WATER HEATERS

(71) Applicant: Rheem Manufacturing Company, Atlanta, GA (US)

(72) Inventors: Joseph D. Gardner, Montgomery, AL (US); Jozef Boros, Montgomery, AL (US); Sina Jasteh, Montgomery, AL (US); Hector J. Donastorg, Auburn, AL (US); Raheel A. Chaudhry, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 176 days.

(21) Appl. No.: 15/815,305

(22) Filed: Nov. 16, 2017

(65) Prior Publication Data

US 2019/0145662 A1 May 16, 2019

(51) Int. Cl.
| *F24H 9/20* | (2006.01) |
| *B65D 90/24* | (2006.01) |
| *F24H 9/16* | (2006.01) |
| *G01M 3/16* | (2006.01) |
| *E03B 7/07* | (2006.01) |
| *G01M 3/18* | (2006.01) |

(52) U.S. Cl.
CPC ........... *F24H 9/2007* (2013.01); *B65D 90/24* (2013.01); *E03B 7/071* (2013.01); *F24H 9/165* (2013.01); *G01M 3/165* (2013.01); *G01M 3/186* (2013.01)

(58) Field of Classification Search
CPC ....... F24H 9/2007; F24H 9/165; B65D 90/24; E03B 7/071; G01M 3/165; G01M 3/186

USPC .......................................................... 122/507
See application file for complete search history.

(56) References Cited

U.S. PATENT DOCUMENTS 5,315,291 A * 5/1994 Furr ........................ G01M 3/16
 200/61.05
5,325,810 A * 7/1994 Bannister .............. G01M 3/042
 116/200

(Continued)

FOREIGN PATENT DOCUMENTS

| CN | 106323562 | 1/2017 |
| WO | WO 2017/014853 | 1/2017 |

OTHER PUBLICATIONS

International search report for PCT/US2018/060004, dated Feb. 21, 2019.

*Primary Examiner* — Edelmira Bosques
*Assistant Examiner* — Benjamin W Johnson
(74) *Attorney, Agent, or Firm* — Troutman Pepper Hamilton Sanders LLP

(57) ABSTRACT

A water heater includes a leak detection system that is integrated with the water heater. The leak detection system includes a channel that extends circumferentially around the water heater. In one example, the channel is built into the water heater. In another example, the channel is formed by a sensor bracket that is coupled to the water heater. Further, the leak detection system includes a sensor assembly that is configured to detect water that leaks from the water heater. The sensor assembly includes a leak sensor and/or a wicking tube. The wicking tube is disposed around at least a portion of the leak sensor. Further, the wicking tube is disposed in the continuous channel and extends circumferentially along the water heater to create a circumferential area of leak detection around the water heater.

20 Claims, 21 Drawing Sheets

(56) References Cited

U.S. PATENT DOCUMENTS

| | | | | |
|---|---|---|---|---|
| 5,345,224 A | * | 9/1994 | Brown | F24H 9/165 |
| | | | | 340/605 |
| 5,844,492 A | * | 12/1998 | Buffin, Sr. | F24H 9/2035 |
| | | | | 340/632 |
| 6,877,359 B2 | | 4/2005 | Huang et al. | |
| 2007/0261241 A1 | | 11/2007 | Akkala et al. | |
| 2014/0033915 A1 | | 2/2014 | Hering et al. | |

* cited by examiner

INTEGRATED LEAK DETECTION SYSTEM FOR WATER HEATERS

TECHNICAL FIELD

The present disclosure relates generally to water heaters, and more particularly to an integrated leak detection unit in water heaters.

BACKGROUND

A water heater may be subject to deterioration over the course of its life. Such deterioration may compromise the integrity of the water heater and may cause water that is stored in a storage tank assembly of the water heater to leak. For example, the water may leak from the storage tank assembly of the water heater onto a drain pan on which the water heater is disposed. In another example, the water may leak from fittings or couplings of the water heater onto an outer jacket surrounding the storage tank assembly of the water heater. In yet another example, the water may leak from the storage tank assembly into a cavity in between the storage tank assembly and the outer jacket of the water heater. In the latter example, the water that collects in the cavity may escape to an external surface of the water heater's outer jacket. The water that leaks from the water heater may eventually pool at the base of the water heater. If left undetected and unattended, such leaks may result in incidental damage to furniture, electrical equipment, the water heater itself, and/or other property, which in turn may result in costly repairs.

Existing water heaters may include a leak sensor that is configured to detect a leak condition, i.e., a water leak from the water heater. However, the leak sensor is typically provided as a separate accessory that a person must manually install on site. If the person fails to install the leak sensor or installs the leak sensor incorrectly, the leak sensing capability of the water heater is negated. Further, existing water heaters are typically disposed on a drain pan that is configured to collect the water that leaks from the water heaters. Once a substantial amount of water is collected or pools in the drain pan, the leak sensor that is disposed on one side of the drain pan, e.g., adjacent a front side of the water heater, may detect a leak condition. Since the leak sensor is disposed on one side or only a portion of the water heater, a leak that begins at an opposite side or any other side may not be detected, until a sufficient amount of water leaks and pools in the drain pan to reach the leak sensor. That is, leak detection systems in existing water heaters are slow and inefficient. A leak sensor that extends circumferentially around a water heater can be used to quickly detect leaks that originate anywhere around the water heater. However, such leak sensors may be expensive and therefore, said solution may not be cost effective. Furthermore, existing water heaters that are disposed on drain pans may require a larger space for installation since the drain pan is typically wider than the circumference of the water heater. However, such larger spaces for installation may not always be available.

Some water heaters can be directly disposed on the floor, as opposed to on a drain pan. However, said water heaters do not include a mechanism to direct the leaking water towards the leak sensor in the absence of the drain pan that traps water in an immediate vicinity of the water heater. Further, if the water heater is disposed on a surface having a gradient, the water pooling at the base of the water heater may flow away from the water heater (and from the leak sensor), which in turn may result in a failure to detect the leak condition, unless one or more leak sensors are disposed circumferentially around the entire water heater to detect a leak from any direction. As described above, the use of multiple leak sensors or a leak sensor that can circumferentially extend around the water heater may be cost prohibitive.

In light of the above mentioned shortcomings of the conventional water heaters, there is a need for an improved leak detection system in water heaters. Further, this background information is provided to reveal information believed by the applicant to be of possible relevance to the present disclosure. No admission is necessarily intended, nor should be construed, that any of the preceding information constitutes prior art against the present disclosure.

SUMMARY

In one aspect, the present disclosure is related to a water heater that includes a leak detection system that is integrated with the water heater. The leak detection system includes a sensor bracket that is coupled to the water heater such that the sensor bracket defines a channel that extends circumferentially around the water heater. The sensor bracket comprises a plurality of through slots that provide access to the channel. Further, the leak detection system includes a sensor assembly that is configured to detect water that leaks from the water heater. The sensor assembly includes a leak sensor and a wicking tube that is formed of a wicking material and configured to transport the water towards the leak sensor. The wicking tube is disposed around at least a portion of the leak sensor. The wicking material is disposed in the channel and extends circumferentially around the water heater.

In another aspect, the present disclosure is related to a water heater that includes a leak detection system that is integrated with the water heater. The leak detection system includes a sensor bracket that is coupled to the water heater such that the sensor bracket defines a channel that extends circumferentially around the water heater. The sensor bracket comprises a plurality of through slots that provide access to the channel. Further, the leak detection system includes a leak sensor that is configured to detect water that leaks from the water heater. The leak sensor is disposed in the channel and extends circumferentially around the water heater. Further, the water heater includes a shut-off valve that is configured to control a flow of the water into a storage tank of the water heater. Furthermore, the water heater includes a controller that is coupled to the leak sensor and configured to control the shut-off valve. Responsive to receiving a signal from the leak sensor that the leak sensor has detected water, the controller is configured to: (a) close the shut-off valve during a first mode of operation, and send a query to a computing device of a user associated with the water heater and close the shut-off valve based on an input from the user during a second mode of operation.

In yet another aspect, the present disclosure is related to a water heater that includes a leak detection system that is integrated with the water heater. The leak detection system includes a channel that is formed in a portion of the water heater. The channel extends circumferentially around the water heater. Further, the leak detection system includes a sensor assembly that is configured to detect water that leaks from the water heater. The sensor assembly includes a leak sensor, and a wicking tube that is formed of a wicking material and configured to transport the water towards the leak sensor. The wicking tube is disposed around at least a portion of the leak sensor. Further, the wicking tube is disposed in the channel and extends circumferentially around the water heater.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
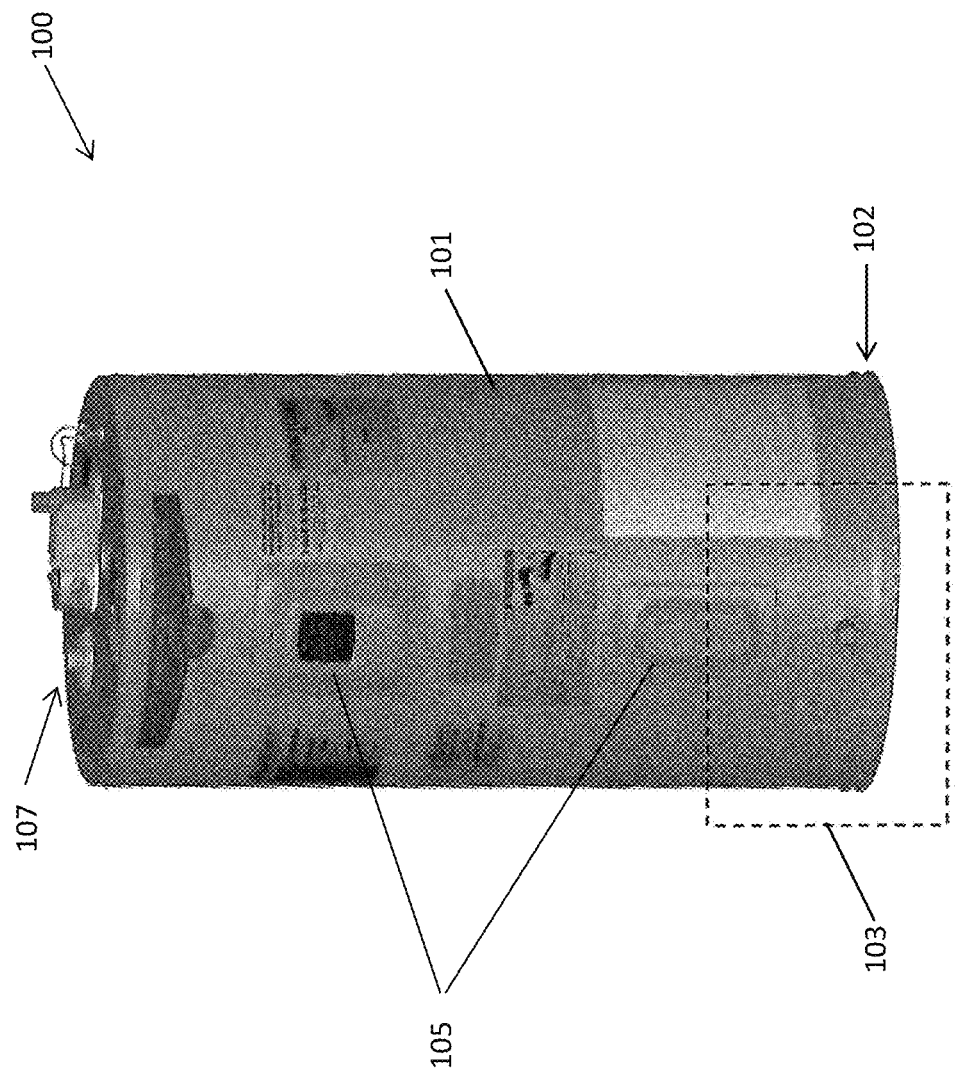
FIG. 1 illustrates a water heater with an example leak detection system that is integrated with the water heater, in accordance with example embodiments of the present disclosure.
Figure 2:
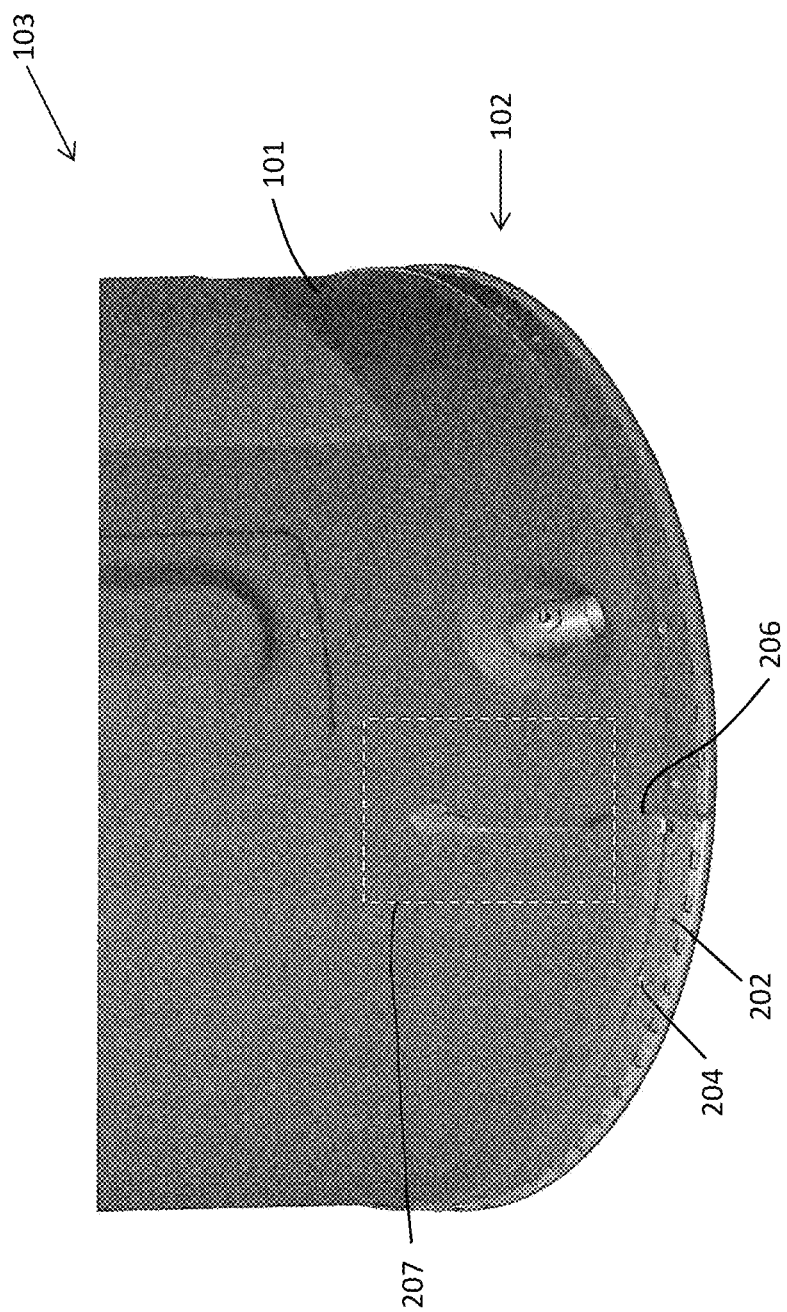
FIG. 2 illustrates an enlarged view of a bottom portion of the water heater of FIG. 1 with the example leak detection system, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

In the foregoing figures showing example embodiments of water heaters with the integrated leak detection system, one or more of the components shown may be omitted, repeated, and/or substituted. Accordingly, the example embodiments of water heaters should not be considered limited to the specific arrangements of components shown in any of the figures. For example, features shown in one or more figures or described with respect to one embodiment can be applied to another embodiment associated with a different figure or description.

DETAILED DESCRIPTION OF EXAMPLE EMBODIMENTS

The present disclosure describes a water heater with a leak detection system that is integrated with the water heater. Such an integration ensures that the leak detection system is installed when the water heater leaves the manufacturing facility and remains connected to the water heater by default. The factory installation of the leak detection system or the integration of the leak detection system into the design of the water heater during a manufacturing process of the water heater minimizes the possibility that a user would fail to install the leak sensor on-site.

In one example, the leak detection system includes a sensor bracket that is coupled to and disposed circumferentially around a bottom pan of the water heater. In particular, the sensor bracket includes an annular sidewall that extends from a top edge to a bottom edge, an annular lip that extends from the top edge of the sidewall, and a curved housing portion that extends from the bottom edge of the sidewall. The curved housing section of the sensor bracket includes a plurality of through slots that are formed in a top portion and/or a bottom portion of the curved housing section. Further, the curved housing section of the sensor bracket forms a continuous channel with the bottom pan when the sensor bracket is coupled to the bottom pan.

In addition to the sensor bracket, the leak detection system includes a sensor assembly. The sensor assembly includes a leak sensor and a wicking tube formed of a wicking material. The leak sensor may have a sensing segment and a connector disposed at an end of the leak sensor. The wicking tube may receive at least a portion of the sensing segment of the leak sensor therein. Further, the wicking tube is configured to move or wick water to the leak sensor when any portion of the wicking tube comes in contact with water (e.g., water that leaks from the water heater). In particular, the wicking tube is long enough to be wrapped around or circumferentially extend around the bottom pan of the water heater at least once to create a circumferential area of leak detection around the water heater. The wicking tube that extends circumferentially around the bottom pan allows the water heater to operate using a short leak sensor, thereby being cost effective. That is, the water heater does not have to use a long leak sensor that extends around the water heater to create a circumferential area of leak detection around the water heater. Instead, the water heater can use a short leak sensor that may extend along a portion of a circumference of the water heater and use a wicking tube to cover a remainder of the circumference of the water heater since the wicking tube can transport water reaching the wicking tube from any portion of water heater towards the leak sensor.

At least a portion of the sensor assembly, e.g., the wicking tube and a portion of the leak sensor that is disposed in the wicking tube, is disposed in the curved housing section of the sensor bracket and within the continuous channel defined by the curved housing section and the bottom pan. A remainder portion of the leak sensor including the connector end of the leak sensor extends out from the continuous channel via one of the plurality of through slots in the curved housing section of the sensor bracket. Further, the plurality of through slots provides a path for the water that leaks from the water heater to enter the continuous channel and reach the wicking tube disposed therein. The curved housing section also acts as a shield for the wicking tube to prevent damage to the sensor assembly during installation of the water heater.

In another example, the leak detection system does not include the sensor bracket. Instead, the leak detection system includes a plurality of features that are formed into the bottom pan of the water heater to define a continuous channel that is built into the bottom pan. In particular, the bottom pan includes a base and sidewall that extends substantially perpendicular to the base along a perimeter of the base. The base and the sidewall define a cavity that is configured to receive and support at least the storage tank and the outer jacket of the water heater. The plurality of features that are formed into the bottom pan include a plurality of protrusions that are defined by portions of the sidewall of the bottom pan that project inwards towards the inner cavity. Further, the plurality of protrusions are positioned adjacent the base of the bottom pan. Furthermore, the plurality of protrusions are separated by a plurality of separator tabs that are formed by portions of the sidewall that do not project inwards such that each adjacent pair of protrusions is separated by a separator tab.

The plurality of protrusions and the plurality of the separator tabs are configured such that they define the continuous channel comprising multiple first segment portions and second segment portions. In particular, the first segment portions of the continuous channel are defined by the plurality of protrusions and are open on an outer facing side of the bottom pan, while the second segment portions of the continuous channel are defined by the plurality of separator tabs and are open on an inner facing side of the bottom pan. In other words, the first segment portions of the continuous channel are open in a direction away from the cavity of the bottom pan and are closed to the cavity, while the second segment portions are open in the direction of the cavity and are open towards the cavity defined by the bottom pan. The portion of the sensor assembly that is disposed in the continuous channel may be exposed to the external environment and closed to the cavity at the first segment portions, while being closed to the external environment and open to the cavity defined by the bottom pan in the second segment portions. That is, the portion of the sensor assembly that is disposed in the continuous channel weaves between the first segment portions that are closed to the cavity and the second segment portions that are open towards the cavity. Further, any water that leaks from the water heater may enter the continuous channel via the first segment portion and/or the second segment portion and reach the wicking material which draws the leaked water to the leak sensor.

Upon detecting the water, the leak sensor sends a signal to a controller of the water heater. The controller sends a notification to alert a user and may await input from the user or automatically send power to a shut off valve to interrupt water flow into the storage tank of the water heater.

In addition to providing the wicking tube, the water heater of the present disclosure may include additional features that are built into the water heater to drive the flow of the water that leaks from the water heater to the sensor assembly. One example embodiment includes a raised surface formed in the base of the bottom pan to create a narrow gap between the underside of the base and the mounting surface, such as the floor, when the bottom pan is disposed on the mounting surface. The narrow gap may create a capillary channel between the base and the mounting surface which in turn draws out the leaked water by capillary effect from the base of the bottom pan towards the sensor assembly that is disposed in the continuous channel formed adjacent the perimeter of the base. In this example embodiment, the water heater is configured to be installed directly on a mounting surface, such as a floor, without a drain pan. Furthermore, it is noted that even though a tank based water heater is described herein, the example embodiments of the present disclosure can be applied to other types of water heaters, such as tankless water heaters, without departing from a broader scope of the present disclosure. Also, even though the present disclosure describes a heater for heating water, one of ordinary skill in the art can understand that the example embodiments of the present disclosure can be applied to a heater that is configured to heat any appropriate fluid without departing from a broader scope of the present disclosure.

Example embodiments of the water heater with the integrated leak detection system will be described more fully hereinafter with reference to the accompanying drawings that describe representative embodiments of the present technology. If a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

The technology of the water heater with the integrated leak detection system may be embodied in many different forms and should not be construed as limited to the embodiments set forth herein; rather, these embodiments are provided so that this disclosure will be thorough and complete, and will fully convey the scope of the technology to those appropriately skilled in the art. Further, example embodiments of the present disclosure can be used for any size (e.g., capacity) of water heater. Furthermore, example embodiments of the present disclosure can be located in any type of environment (e.g., warehouse, attic, garage, storage, mechanical room, basement) for any type (e.g., commercial, residential, industrial) of user. Water heaters used with example embodiments can include both electric and/or fuel fired water heaters that can be used for one or more of any number of processes (e.g., automatic clothes washers, automatic dishwashers, showers, sink faucets, heating systems, humidifiers).

Water heater systems (or components thereof, including controllers) described herein can be made of one or more of a number of suitable materials to allow that device and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Further, components of a water heater system (or portions thereof) described herein can be made from a single piece (as from a mold, injection mold, die cast, or extrusion process). In addition, or in the alternative, components of a water heater system (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Terms such as "first", "second", "third", "top", "bottom", "side", and "within" are used merely to distinguish one component (or part of a component or state of a component) from another. Such terms are not meant to denote a preference or a particular orientation, and are not meant to limit embodiments of water heaters with integrated leak detection systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Turning now to the figures, example embodiments of a water heater with the integrated leak detection system will be described in connection with FIGS. 1-21. In particular, a water heater with one example integrated leak detection system including a sensor bracket will be described in connection with FIGS. 1-12; a water heater with another example integrated leak detection system including a bottom pan will be described in connection with FIGS. 13-19; an example feature for directing a flow of the water leaking from the water heater towards a sensor assembly will be described in connection with FIGS. 20-21; and an example operation of a controller of the water heater will be described in connection with FIG. 22.

Water Heater with an Integrated Leak Detection System Having a Sensor Bracket

Turning to FIGS. 1-12, an example water heater 100 may include a storage tank (not shown) that is configured to store water that is to be heated by the water heater 100, and an outer jacket 101 that is disposed around the storage tank. The water heater 100 may include a bottom pan 402 (shown in FIGS. 4, 5, and 12) that receives and supports the storage tank and the outer jacket 101. Furthermore, the water heater 100 may include a leak detection system 102 that is configured to detect water (or any appropriate fluid) that leaks from the water heater 100 (e.g., the storage tank of the water heater 100). One of ordinary skill in the art can understand and appreciate that in addition to the components described above, the water heater 100 may include many other additional components such as, thermostats, heating elements, dip tubes, plumbing, drain pipes, etc. However, said additional components are not described herein to avoid obscuring the features of the leak detection system of the water heater.

Figure 5:
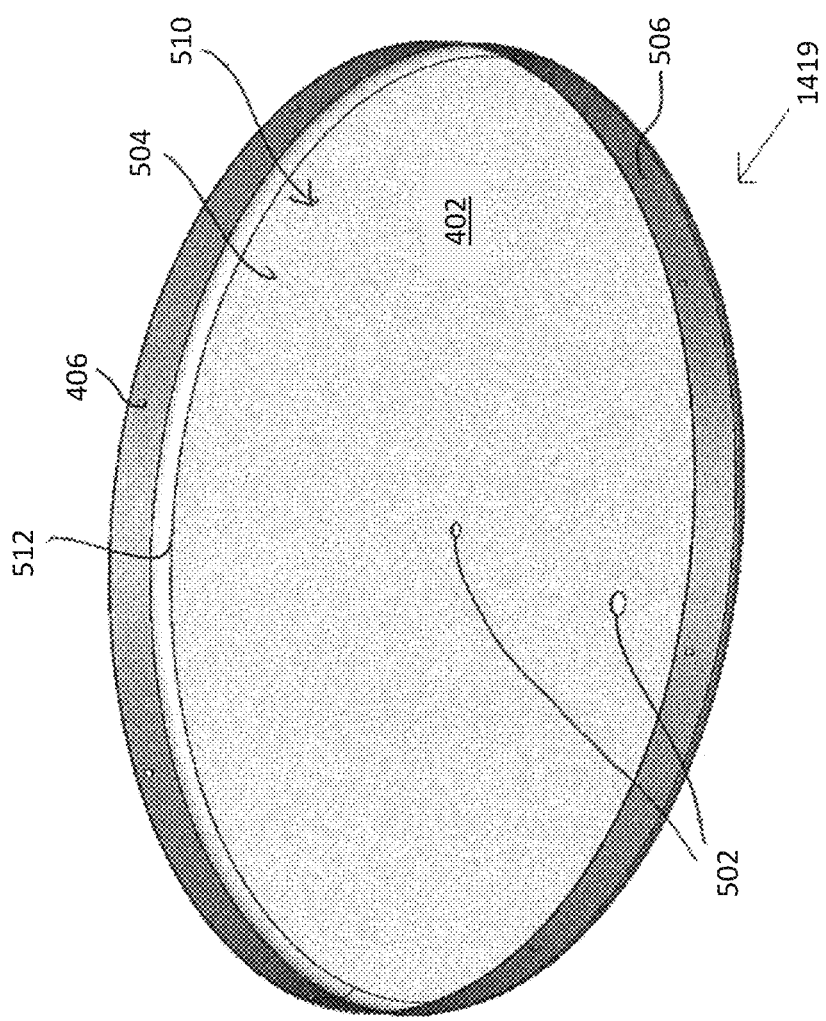
FIG. 5 illustrates the bottom pan of the water heater, in accordance with example embodiments of the present disclosure.
Figure 6:
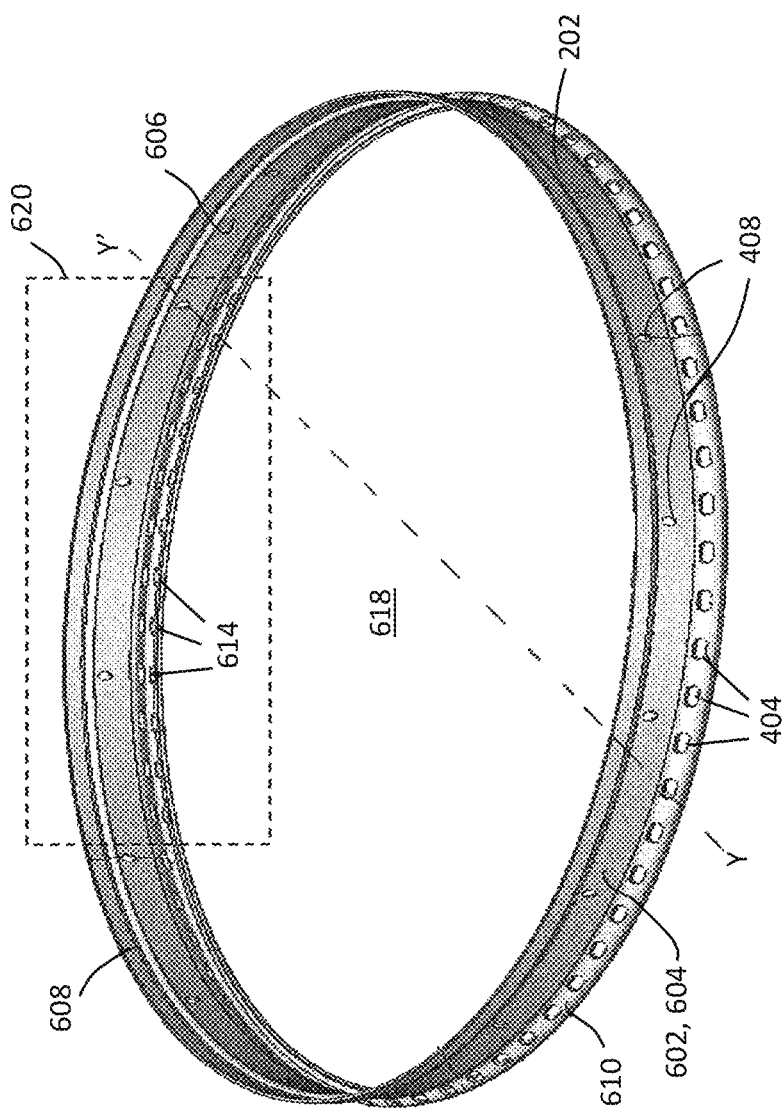
FIG. 6 illustrates a sensor bracket of the example leak detection system, in accordance with example embodiments of the present disclosure.
Figure 7:
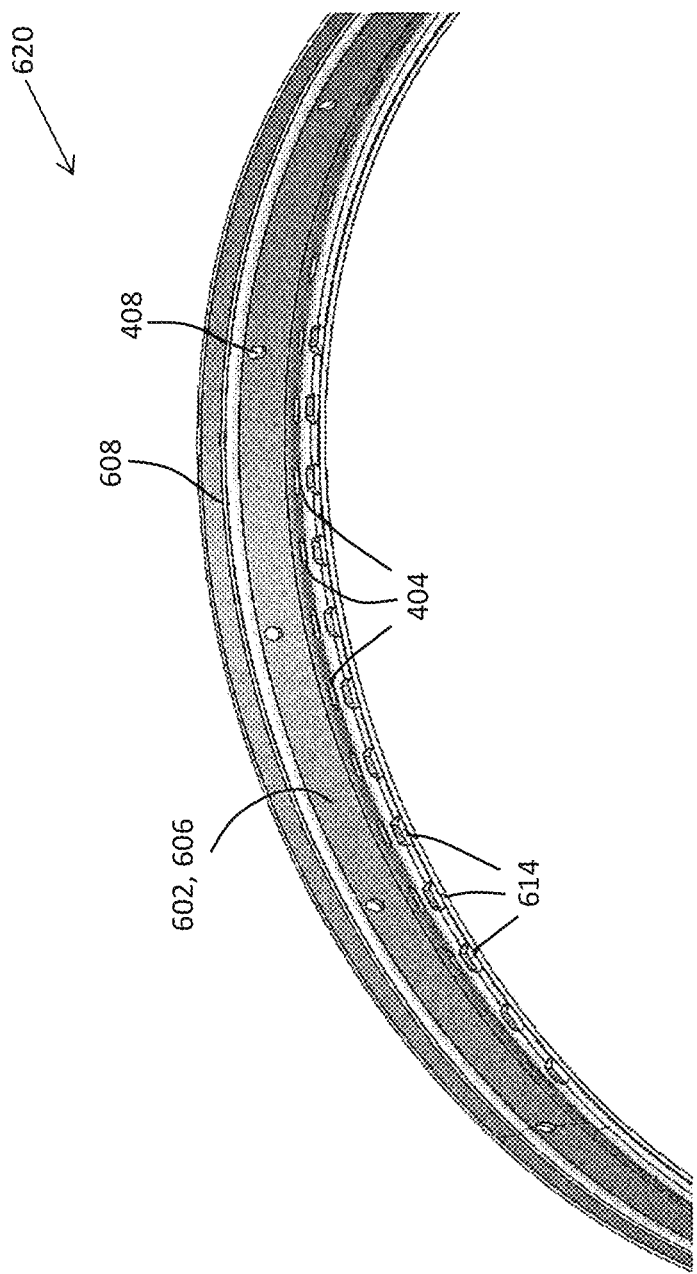
FIG. 7 illustrates an enlarged view of a portion of the sensor bracket of the example leak detection system, in accordance with example embodiments of the present disclosure.
Figure 8:
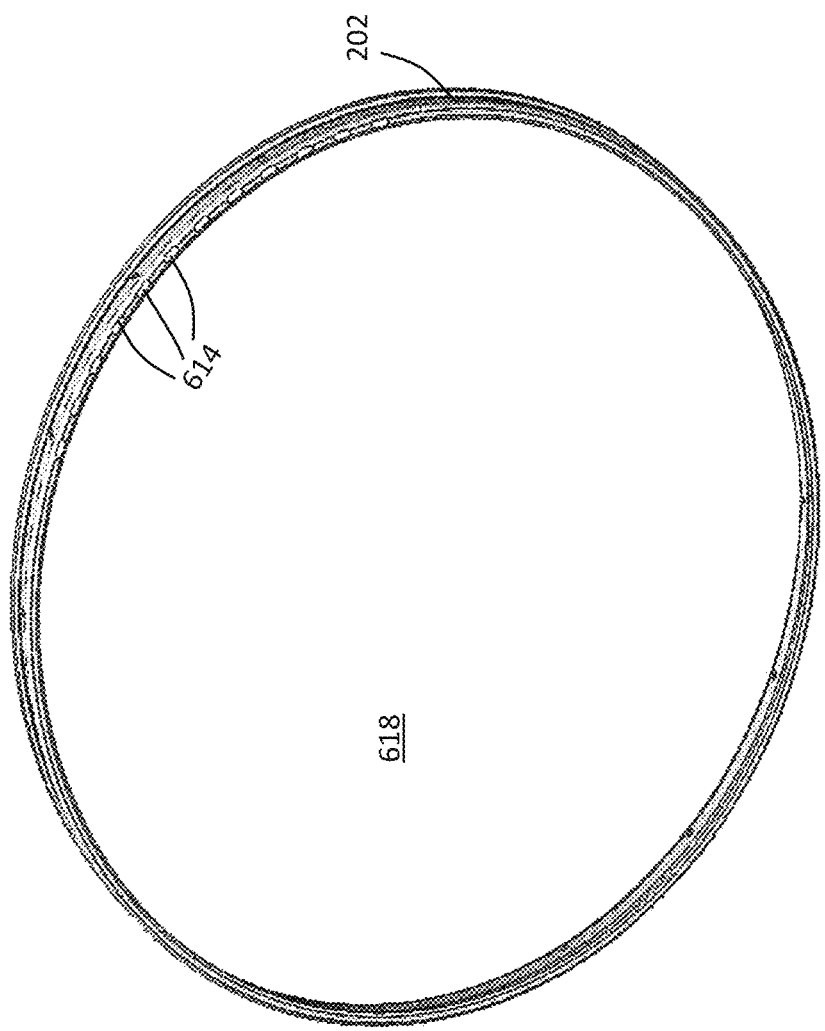
FIG. 8 illustrates a bottom isometric view of the sensor bracket of the example leak detection system, in accordance with example embodiments of the present disclosure.
Figure 9:
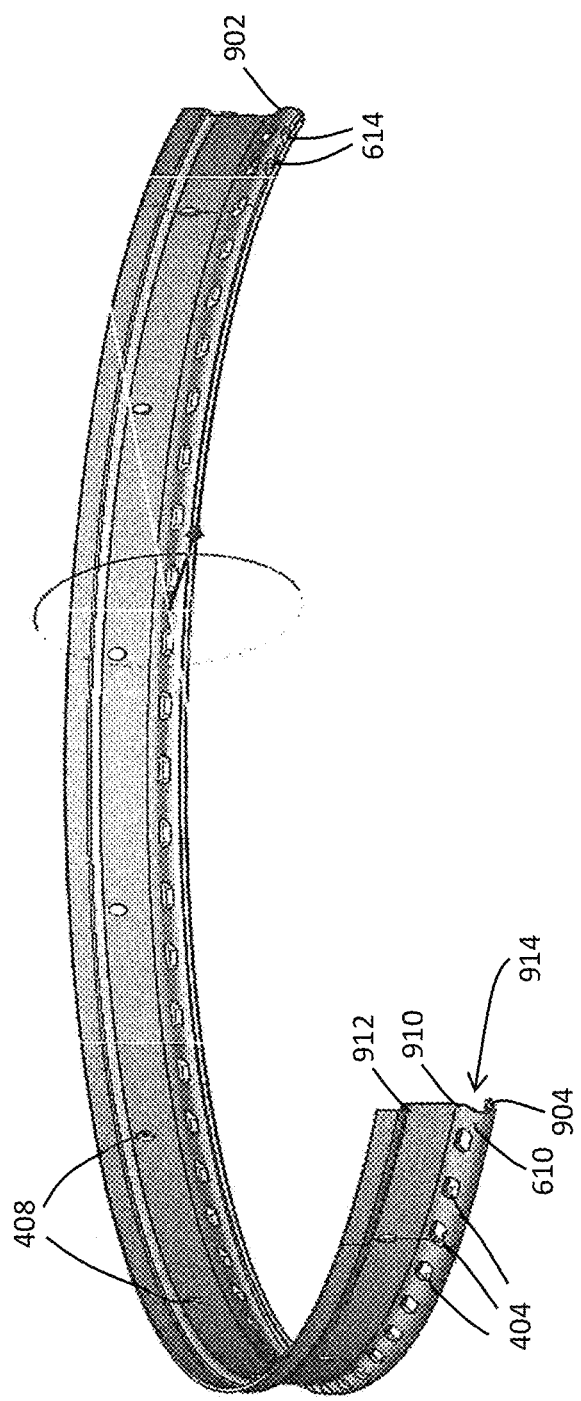
FIG. 9 illustrates a cross-sectional view of the sensor bracket of FIG. 6 along a Y-Y' axis, in accordance with example embodiments of the present disclosure.

As illustrated in FIG. 5, the bottom pan 402 includes a base 504 that is substantially circular and a sidewall 506 that is substantially cylindrical. The sidewall 506 extends substantially perpendicular to the base 504 along a perimeter 512 of the base 504 such that the base 504 and the sidewall 506 of the bottom pan 402 define a cavity 510. In particular, the cavity 510 may be configured to receive and support the storage tank of the water heater 100 therein. In one example embodiment, a bottom head insulation pad 1802 (shown in FIG. 18) may be disposed in the cavity 510 of the bottom pan 402; and the storage tank may be disposed on the bottom head insulation pad 1802 such that the bottom head insulation pad 1802 acts as an insulating layer between the bottom surface of the tank and the base 504 of the bottom pan 402. However, in another example embodiment, the bottom surface of the storage tank may be directly disposed on the base 504 of the bottom pan 402. Further, as illustrated in FIG. 5, the bottom pan 402 may include a plurality of through holes 502 formed in the base 504 of the bottom pan 402. The plurality of through holes 502 may be used to hang the bottom pan 402 during installation and/or to provide a path for water that leaks from the bottom of the storage tank to reach the leak detection system 102. Furthermore, as illustrated in FIG. 5, the bottom pan 402 may include a plurality of coupling holes 406 (through holes) that are formed in the sidewall 506 of the bottom pan 402. The plurality of coupling holes 406 are configured to receive fasteners 204 therethrough to couple the bottom pan 402 to a sensor bracket 202 of the leak detection system 102.

Even though the present disclosure describes a bottom pan having a base that is substantially circular in shape and a sidewall that is substantially cylindrical in shape, one of ordinary skill in the art can understand and appreciate that the base and the sidewall of the bottom pan can have any other appropriate geometric or non-geometric shape without departing from a broader scope of the present disclosure. For example, the base of the bottom pan may be rectangular in shape and the sidewall may be cuboid in shape. Further, in some example embodiments, the sidewall may form an obtuse or an acute internal angle with the base without departing from a broader scope of the present disclosure.

The leak detection system 102 of the water heater 100 may include a sensor bracket 202 (shown in FIGS. 2, 6-9, and 12) that is coupled to the bottom pan 402, and a sensor assembly (e.g., leak sensor 206 shown in FIGS. 2-3 and wicking tube 1000 shown in FIGS. 10-12, 14, and 18-20) that is disposed in the sensor bracket 202.

As illustrated in FIGS. 6-9, the sensor bracket 202 may include an annular sidewall 602 that extends from an upper edge 912 to a lower edge 910 and defines a cavity 618 of the sensor bracket 202. The annular sidewall 602 has an inner surface 606 and an outer surface 604. The annular sidewall 602 may include a plurality of coupling holes 408 that extend from the outer surface 604 through the inner surface 606. The plurality of coupling holes 408 are configured to receive fasteners 204 therethrough to couple the sensor bracket 202 to the bottom pan 402. Further, the sensor bracket 202 may include an annular upper lip 608 that extends from the upper edge 912 of the sidewall 602. In one example embodiment, the annular upper lip 608 may be an annular step that has a substantially L-shaped cross-sectional profile. The annular upper lip 608 may be defined by: (i) a first horizontal portion 1202 (shown in FIG. 12) that extends substantially perpendicular to the sidewall 602 from the upper edge 912, and (ii) a second vertical portion 1204 (shown in FIG. 12) that extends substantially perpendicular to the first horizontal portion 1202 and substantially parallel to the sidewall 602 from an end of the first horizontal portion 1202. However, in other example embodiments, the annular upper lip 608 may have any other appropriate shape without departing from a broader scope of the present disclosure. For example, the upper lip 608 may have a U-shaped or C-shaped cross-sectional profile with the open end of the upper lip 608 facing upwards. Alternatively, in some examples, the second portion 1204 of the upper lip 608 may form an obtuse internal angle with the first horizontal portion 1202.

In addition to the annular upper lip 608, the sensor bracket 202 may include a curved housing section 610 that extends from the lower edge 910 of the sidewall 602 in a direction that is away from and opposite to the upper lip 608. In one example embodiment, the curved housing section 610 may have a substantially C-shaped cross-sectional profile as illustrated in FIGS. 2, 6-9, and 12. However, in other example embodiments, the curved housing section 610 may have a cross-sectional profile of any other appropriate geometric or non-geometric shape without departing from a broader scope of the present disclosure. For example, in other embodiments, the curved housing section 610 may have a V-shaped cross-sectional profile.

The curved housing section 610 may include a plurality of through slots 404 formed in the top portion 902 of the curved housing section 610 and a plurality of through slots 614 that are formed in the bottom portion 904 of the curved housing section 610. The plurality of through slots 404 formed in the top portion 902 of the curved housing section 610 and the plurality of through slots 614 formed in the bottom portion 904 of the curved housing section 610 may or may not be axially aligned. Further, the plurality of through slots 404 formed in the top portion 902 of the curved housing section 610 may be disposed along the circumference of curved housing section 610 of the sensor bracket 202, while the distribution of the plurality of through slots 614 formed in the bottom portion 904 of the curved housing section 610 may be limited to a portion of the circumference of the sensor bracket 202 that is at a front of the water heater 100. In some example embodiments, the sensor bracket 202 may not include the plurality of through slots 614 disposed on the bottom portion 904 of the curved housing section 610. Instead, the plurality of through slots 614 may be formed in the bottom pan 402 adjacent the perimeter 512 of the base 504 of the bottom pan 402. In particular, the plurality of through slots 614 may be formed in a portion of the bottom pan 402 facing a front side of the water heater 100 for providing a direct path for the water leaking from the storage tank and collecting in the bottom pan to the sensor assembly disposed in the sensor bracket 202 at the front side of the water heater 100.

The sensor bracket 202 may be coupled to the bottom pan 402 by positioning the bottom pan 402 in the cavity 618 defined by the sensor bracket 202 such that: (i) an outer surface of the sidewall 506 of the bottom pan 402 engages or faces the inner surface 606 of the sidewall 602 of the sensor bracket 202, (ii) the coupling holes 406 on the sidewall 506 of the bottom pan 402 are axially aligned with the coupling holes 408 on the sidewall 602 of the sensor bracket 202, and (iii) an open end 914 (shown in FIG. 9) of the curved housing section 610 of the sensor bracket 202 faces the outer surface of the sidewall 506 of the bottom pan 402 adjacent the base 504 of the bottom pan 402. Once the sensor bracket 202 is coupled to the bottom pan 402 of the water heater 100, the curved housing section 610 forms a continuous channel 1206 (shown in FIG. 12) with the bottom pan 402, where the continuous channel 1206 is disposed circumferentially around a bottom edge 1419 of the bottom pan 402. In one example embodiment, the continuous channel 1206 may be fully enclosed by the curved housing section 610 of the sensor bracket 202 and the bottom pan 402 (e.g., sidewall 506 of the bottom pan 402). However, in other example embodiments, the continuous channel 1206 may not be fully enclosed. For example, a slight gap may exist between bottom pan 402 and the bottom portion 904 of the curved housing section 610 of the sensor bracket 202.

Even though the present disclosure describes a sensor bracket 202 having an annular sidewall 602, one of ordinary skill in the art can understand and appreciate that in other example embodiments, the sidewall of the sensor bracket may define a profile having any other appropriate shape without departing from a broader scope of the present disclosure. For example, the sidewall 602 of the sensor bracket 202 may define a square profile, an oval profile, a rectangular profile, etc.

Figure 3:
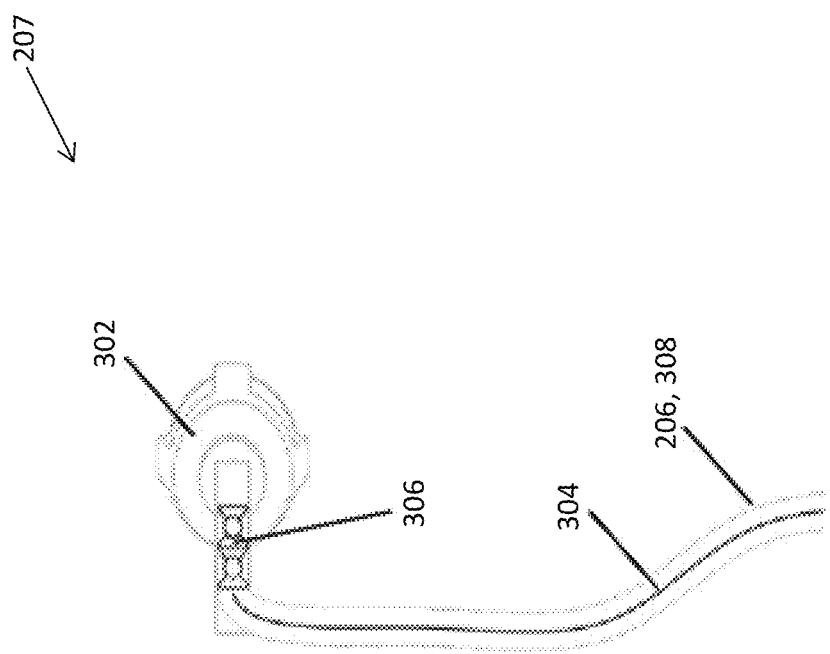
FIG. 3 illustrates an enlarged view of a leak sensor portion of a sensor assembly of the example leak detection system of FIG. 1, in accordance with example embodiments of the present disclosure.
Figure 10:
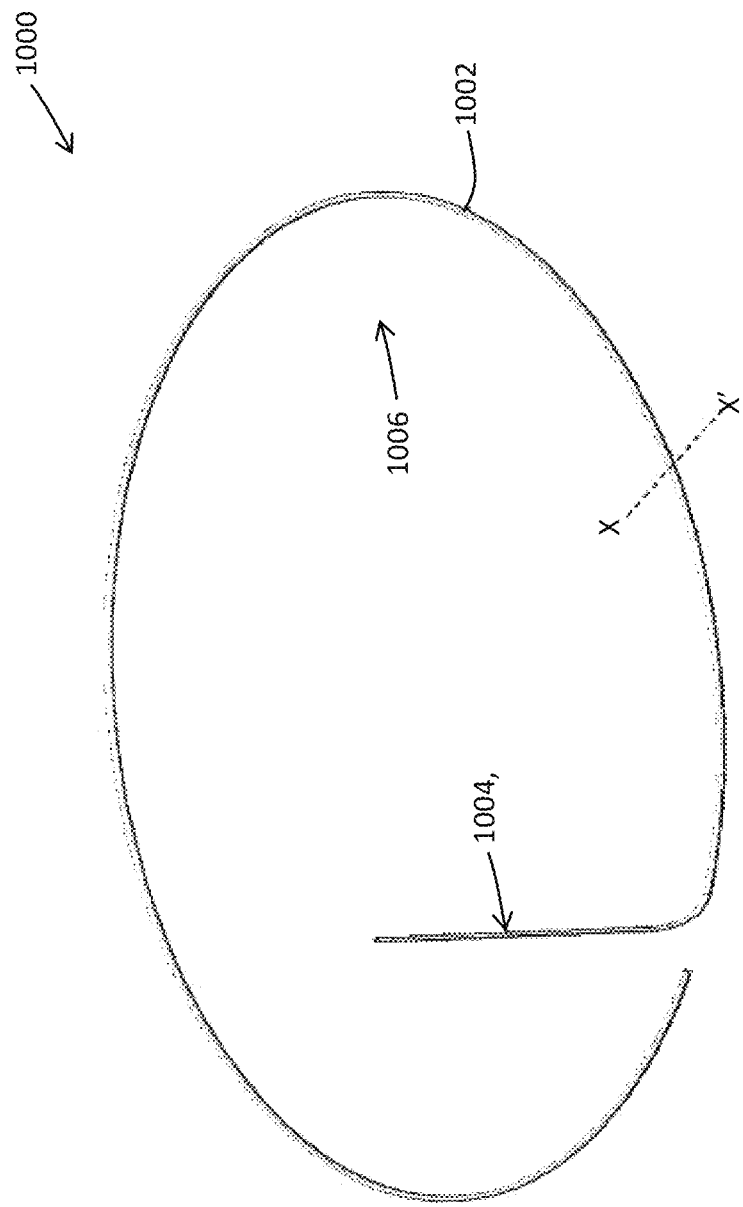
FIG. 10 illustrates a wicking tube portion of the sensor assembly of the example leak detection system of FIG. 1, in accordance with example embodiments of the present disclosure.
Figure 11:
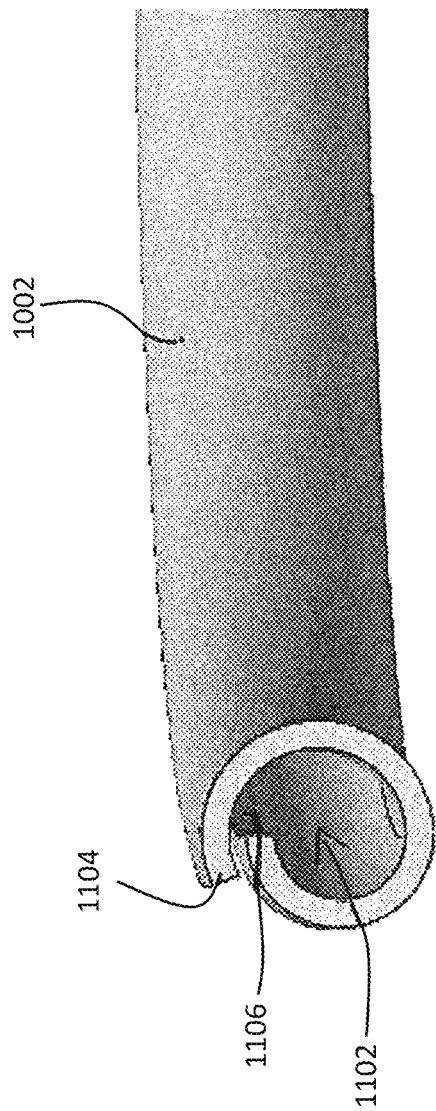
FIG. 11 illustrates a cross sectional view of the wicking tube portion along the X-X' axis shown in FIG. 10, in accordance with example embodiments of the present disclosure.

In addition to the sensor bracket 202, the leak detection system 102 includes a sensor assembly (shown in FIGS. 3, 10, and 11). The sensor assembly may include a leak sensor 206. In one example embodiment, the leak sensor 206 may be a rope sensor that includes: (a) sensing segment comprising metal sensing wires 304 protected by a fiber material 308 disposed around the sensing wires 304, and (b) a connector 306 (e.g., male or female connector) that is coupled to the sensing wires 304 and is disposed at one end of the rope sensor. In other example embodiments, the leak detection system may include any other appropriate sensor that is configured to detect any appropriate fluids that leak from the water heater 100.

Further, the sensor assembly may include a wicking tube 1000 that is made using a wicking material. The wicking tube 1000 has a body 1002 that extends between a first long edge 1104 to a second long edge 1106. In some example embodiments, the first long edge 1104 and the second long edge 1106 may be joined, while in other example embodiments as illustrated in FIGS. 10 and 11, the first long edge 1104 may be detached from the second long edge 1106 and arranged such that the resulting wicking tube has a substantially C-shaped cross-sectional profile or such that one of the long edges overlaps the other. In either case, the wicking tube 1000 may define an internal cavity 1102 that is configured to receive at least a portion of the sensing segment of the leak sensor 206 therein.

In some example embodiments, the wicking tube 1000 may extend all the way along the sensing segment of the leak sensor 206 up to the connector 306, while in other example embodiments, the wicking tube 1000 may extend only partially along the sensing segment of the leak sensor 206. While a portion 1004 of the wicking tube 1000 may cover at least a portion of the sensing segment of the leak sensor 206 as described above, a remaining portion 1006 of the wicking tube 1002 extends further around the circumference of the bottom pan 402 of the water heater 100 to create a circumferential area of leak detection around the water heater 100. That is, the wicking tube 1000 may be circumferentially disposed around the bottom pan 402 of the water heater 100 to detect a leak originating from any portion of the water heater 100. In some example embodiments, the wicking tube 1000 may be long enough to circumferentially extend around the water heater 100 more than once. In other embodiments, the wicking tube 1000 may only extend around a majority of the water heater. The wicking material allows the wicking tube to move or wick water to the sensing segment of the leak sensor 206 when any portion of the wicking tube comes in contact with water that leaks from the water heater 100.

Once the leak is detected by the sensing segment, the leak sensor 206 may send a signal to a controller 105 of the water heater 100 that may be coupled to a shut-off valve 107 of the water heater 100. The leak sensor 206 may be electrically coupled to the controller 105 of the water heater 100 by plugging the connector 306 of the leak sensor 206 into a corresponding connector receptacle 302 (shown in FIG. 3) of the water heater 100 that is connected to the controller 105. Upon receiving the signal, the controller 105 may generate and transmit a notification alerting an end user regarding the leak. Responsively, the controller 105 may wait to receive an input from the end user or automatically control a shut off valve to interrupt water flow into the storage tank of the water heater 100. An example operation of the controller 105 will be described below in greater detail in association with FIG. 22.

Figure 22:
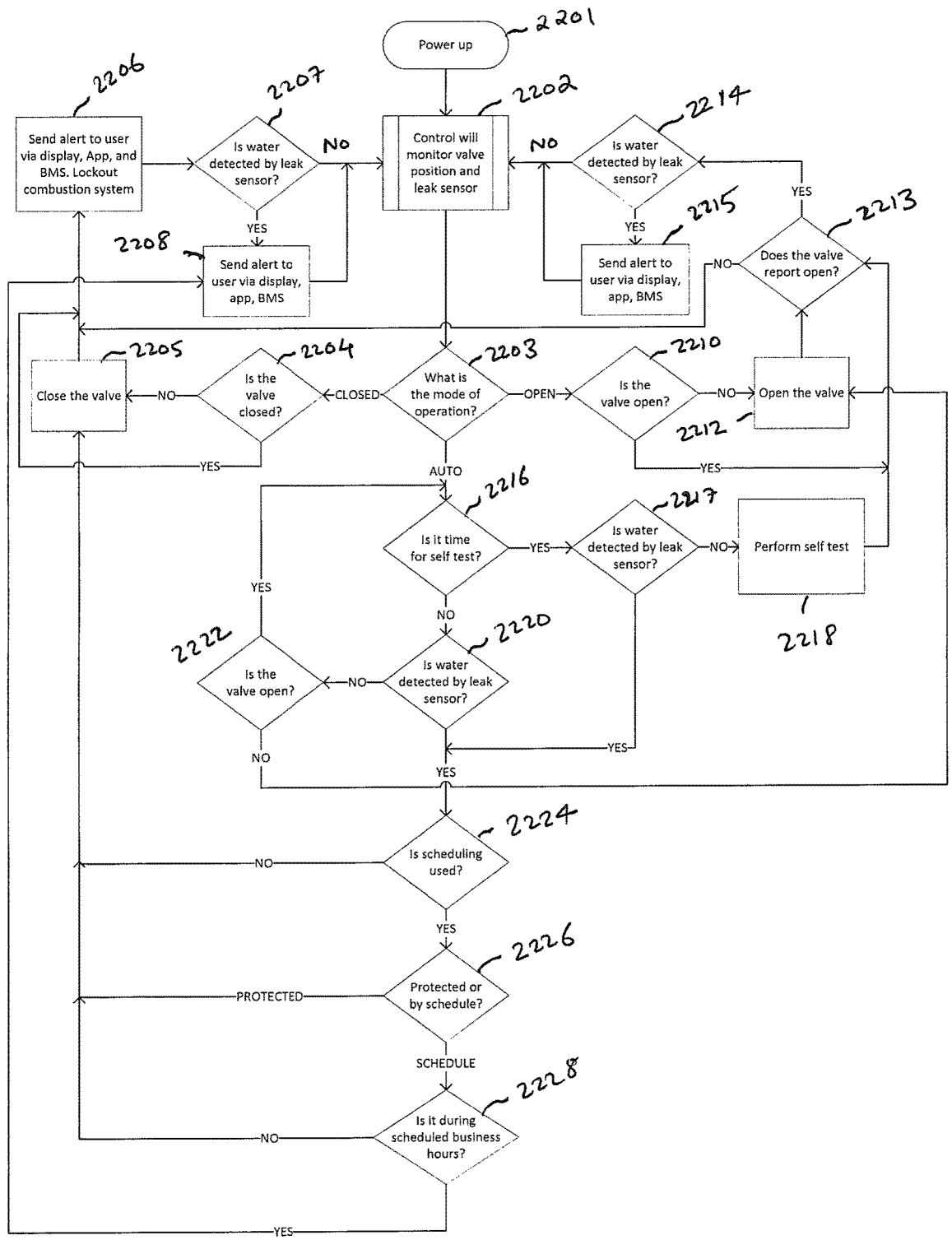
FIG. 22 is a flowchart that illustrates an example operation of a controller of the water heater, in accordance with example embodiments of the present disclosure.

Although specific operations are disclosed in the flowchart illustrated in FIG. 22, such operations are exemplary. That is, embodiments of the present invention are well suited to performing various other operations or variations of the operations recited in the flowchart. It is appreciated that the operations in the flowchart illustrated in FIG. 22 may be performed in an order different than presented, and that not all of the operations in the flowchart may be performed.

All, or a portion of, the embodiments described by the flowchart illustrated in FIG. 22 can be implemented using computer-readable and computer-executable instructions which reside, for example, in a memory associated with the controller 105 or in computer-usable media of a computer system or like device. As described above, certain processes and operations of the present invention are realized, in one embodiment, as a series of instructions (e.g., software programs) that reside within a memory associated with the controller 105 or computer readable memory of a computer system and are executed by the a circuit of the controller 105 or the processor of the computer system. When executed, the instructions cause the computer system or the controller 105 to implement the functionality of the present invention as described below.

The controller 105 may be disposed within the water heater as illustrated in FIG. 1 and may comprise a input/output ports, processor, a memory, and/or a communication interface for wireless and wired communication. Further, the shut-off valve 107 may be disposed at the inlet, e.g., cold water inlet, of the water heater as illustrated in FIG. 1.

Turning to FIG. 22, in operations 2201-2203, the controller 105 will monitor a leak sensor 206 and a valve position of a shut-off valve 107 of the water heater that is configured to control water flow (water that is to be heated, e.g., cold water) into a storage tank of the water heater. Further, the controller 105 determines a mode of operation of the shut-off valve 107 which can include a closed mode, an open mode, and an automatic mode. The automatic mode refers to a mode where the operation of the shut-off valve 107 is tied to the leak sensor 206 such that if a leak is detected, the shut-off valve 107 is closed, otherwise the shut-off valve is open. In the open mode, the shut-off valve 107 is always open, while in the closed mode, the shut-off valve 107 is always closed. In some embodiments, the shut-off valve 107 may have an automatic when unoccupied mode of operation where the shut-off valve 107 is closed only if the leak is detected outside of a predetermined time period, e.g., business hours.

If the controller 105 determines that the shut-off valve 107 is operating in a closed mode, then the controller 105 proceeds to execute operations 2204-2208, where the shut-off valve 107 is closed and an alert indicating that the shut-off valve 107 has been closed is sent to a user if the controller 105 determines that the shut-off valve 107 is open when operating in the closed mode. Alternatively, if the controller 105 determines that the shut-off valve 107 is closed, then an alert is sent to the user indicating the state of the shut-off valve 107 as being closed. Further, the controller 105 determines whether water is detected by the leak sensor 206. If water is detected by the leak sensor 206 (leak condition), the controller 105 sends an alert to a user indicating that a water leak has been detected. The alert may also prompt the user to provide a response indicating whether the controller 105 is to close the shut-off valve 107. Accordingly, the controller 105 may wait to receive an input from the user (either directly or via a computing device of the user) and controls the shut-off valve 107 based on the input received from the user.

If the controller 105 determines that the shut-off valve 107 is operating in the open mode, then the controller 105 proceeds to execute operations 2210-2215, where the shut-off valve 107 is opened if the controller 105 determines that the shut-off valve 107 is closed when operating in the open mode. Alternatively, if the controller 105 determines that the shut-off valve 107 is open, then an alert is sent to the user if the valve is not reporting that it is open despite of being open. Further, the controller 105 determines whether water is detected by the leak sensor 206. If water is detected by the leak sensor 206 (leak condition), as in the case of the closed mode discussed above, the controller 105 sends an alert to a user indicating that a water leak has been detected. As discussed above, the alert prompts the user to provide a response indicating whether the controller 105 is to close the shut-off valve 107. Accordingly, the controller 105 waits to receive an input from the user and controls the shut-off valve 107 based on the input received from the user.

If the controller 105 determines that the shut-off valve 107 is operating in the automatic mode, then the controller 105 proceeds to execute operations 2216-2228, where the controller 105 performs a self-test when the controller 105 determines that it is time for a self-test of the shut-off valve 107 and that water is not detected by the leak sensor. Self-test refers to a process where periodically (every day, week, month, etc.) the controller 105 closes the shut-off valve 107 and waits for a verification signal to make sure the controller 105 can close the shut-off valve 107. If the controller 105 doesn't receive the verification signal, the controller 105 sends an alarm. Further, once the shut-off valve 107 is closed, the controller 105 opens it again and waits for the verification signal to make sure the shut-off valve 107 is fully open. If the controller 105 cannot verify that the shut-off valve 107 is fully open, the controller 105 sends an alarm.

If the leak sensor detects water, then, the controller 105 determines whether the shut-off valve 107 is to be controlled based on a schedule. If not, the controller 105 closes the shut-off valve 107 upon determining that the leak sensor has detected water. However, if the shut-off valve 107 is to be controlled based on a schedule, the controller 105 determines whether a time at which the leak sensor detected the water and reported to the controller 105 (via a signal) is within a scheduled timeframe. The timeframe may be scheduled based on business hours or may be selected by the user. If the time at which the leak sensor detected the water and reported to the controller 105 (via a signal) is outside of a scheduled timeframe, then, the controller 105 automatically closes the shut-off valve 107. However, if the time at which the leak sensor detected the water and reported to the controller 105 (via a signal) is within a scheduled timeframe, then, the controller 105 sends an alert (notification) to the user and waits for an input from the user to control the shut-off valve 107 based on the received user input. In some embodiments, if the user input is not received within a predetermined time period, the controller 105 may automatically close the shut-off valve 107 (override mode).

In one or more example embodiments, the alert can be transmitted to the user's mobile computing device or a desktop via a wireless or a wired network to which the controller 105 may be communicatively coupled. That is the controller 105 may have wireless and/or wired network interfaces. The alert may also be transmitted to a building management system (BMS) to which a user has access. Further, a response from the user, i.e., the user input may be transmitted back to the controller 105 from a computing device via a wireless or a wired network.

In some embodiments, the shut-off valve 107 described herein can work as an isolation valve independent of the leak sensor operation. Further, as discussed above, the shut-off valve 107 can be configured to operate differently within operating hours of a business or within a certain timeframe selected by the user, e.g., (a) within operating hours, the shut off valve may not close in response to leak, and (b) outside operating hours, the shut off valve may close in response to leak. The controller 105 controls the shut-off valve 107. Furthermore, as discussed above, the controller 105 can send a message to user's cell phone asking whether the shut off valve needs to be closed and act according to the user's response.

Returning to FIGS. 1-12, in one example embodiment, the wicking material that is used to form the wicking tube 1000 may have a short dry-out time and may be configured to detect small quantities of water and quickly move or wick water to the sensing segment of the leak sensor 206, which in turn improves the speed and efficiency of the leak detection system. In contrast to prior art solutions that require numerous leak sensors around the water heater, using the wicking tube 1000 to transport water to the leak sensor provides faster and more comprehensive detection of leaks around the entire water heater. Further, the use of leak sensors having small sensing segments may be cost effective and may also contribute towards improving the efficiency of the leak detection system since the time required to dry the leak sensor and reset any alarms may be minimized.

Figure 4:
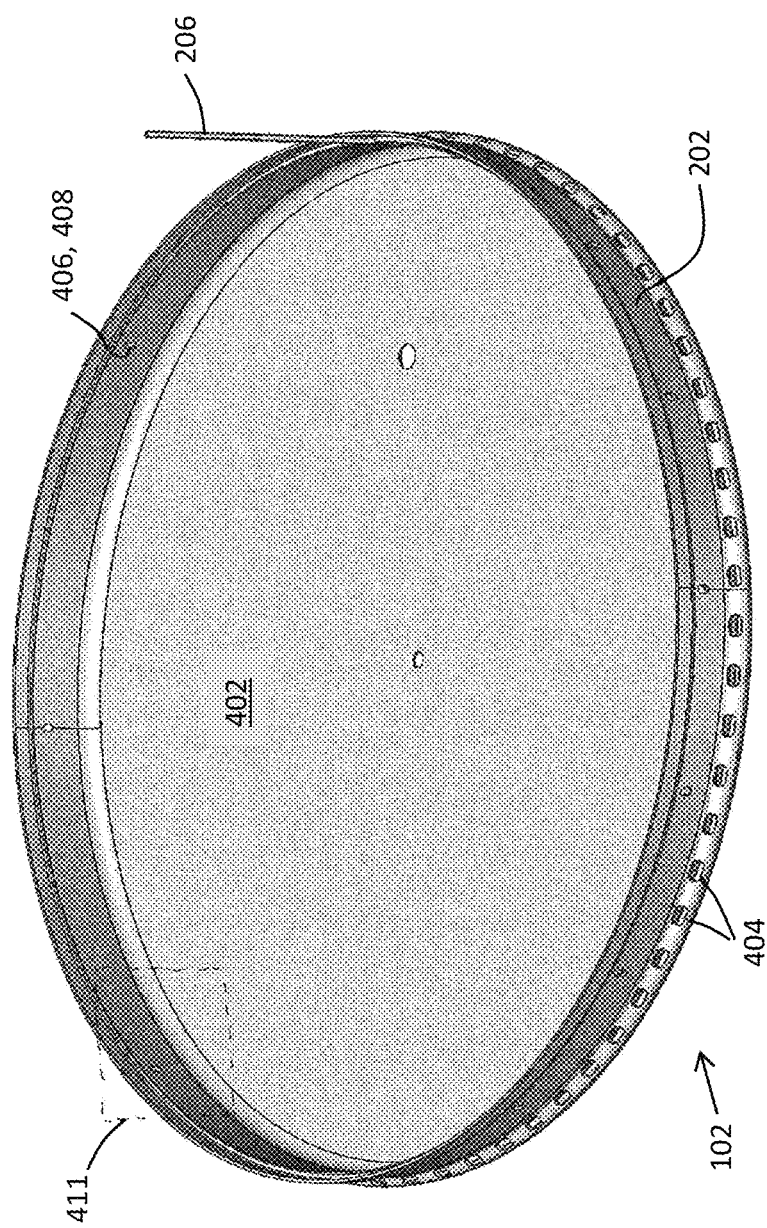
FIG. 4 illustrates a top isometric view of the example leak detection system with a bottom pan of the water heater, in accordance with example embodiments of the present disclosure.
Figure 12:
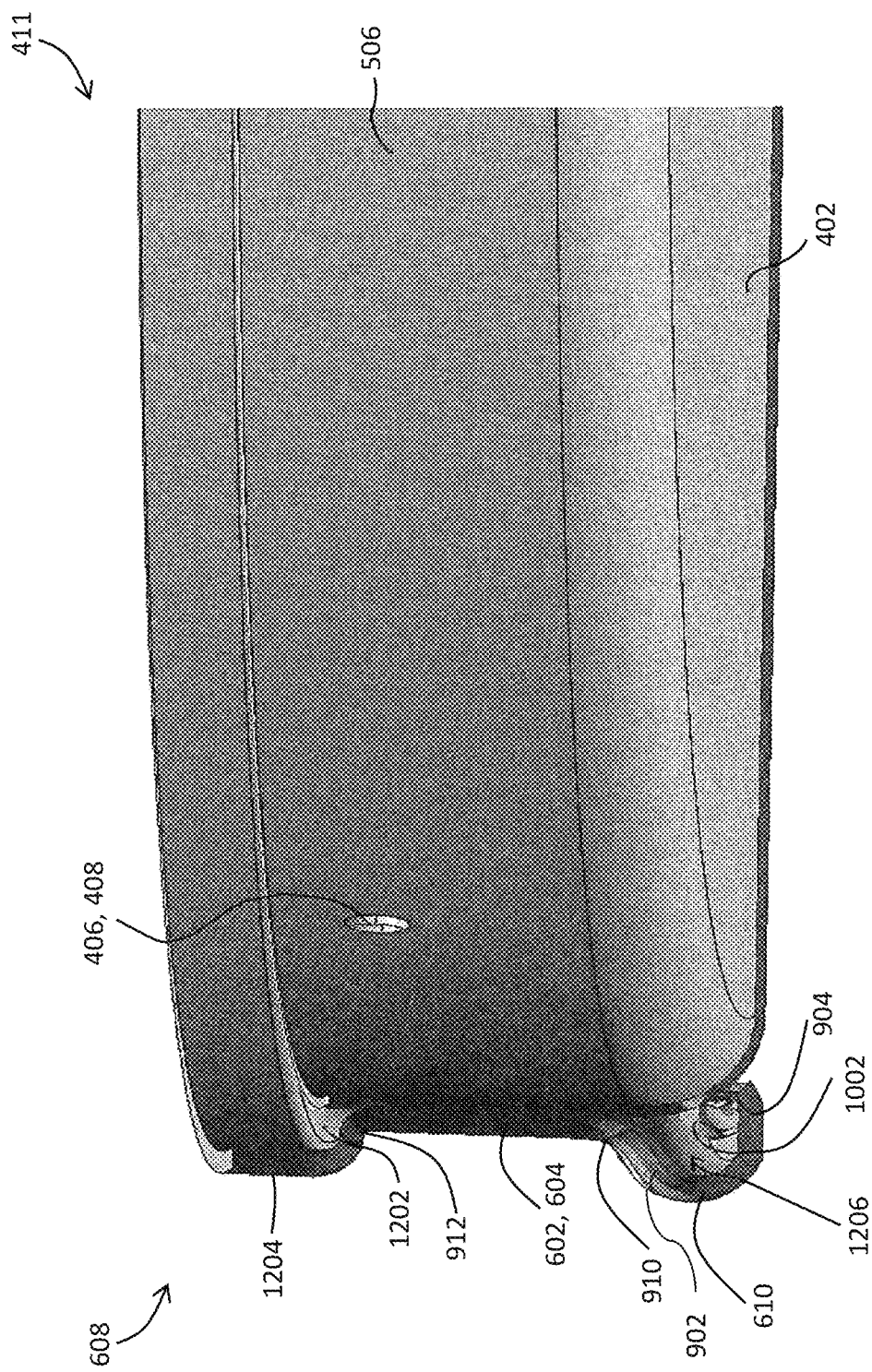
FIG. 12 illustrates an enlarged view of a cross-section of the example leak detection system with the bottom pan of the water heater, in accordance with example embodiments of the present disclosure.
Figure 13:
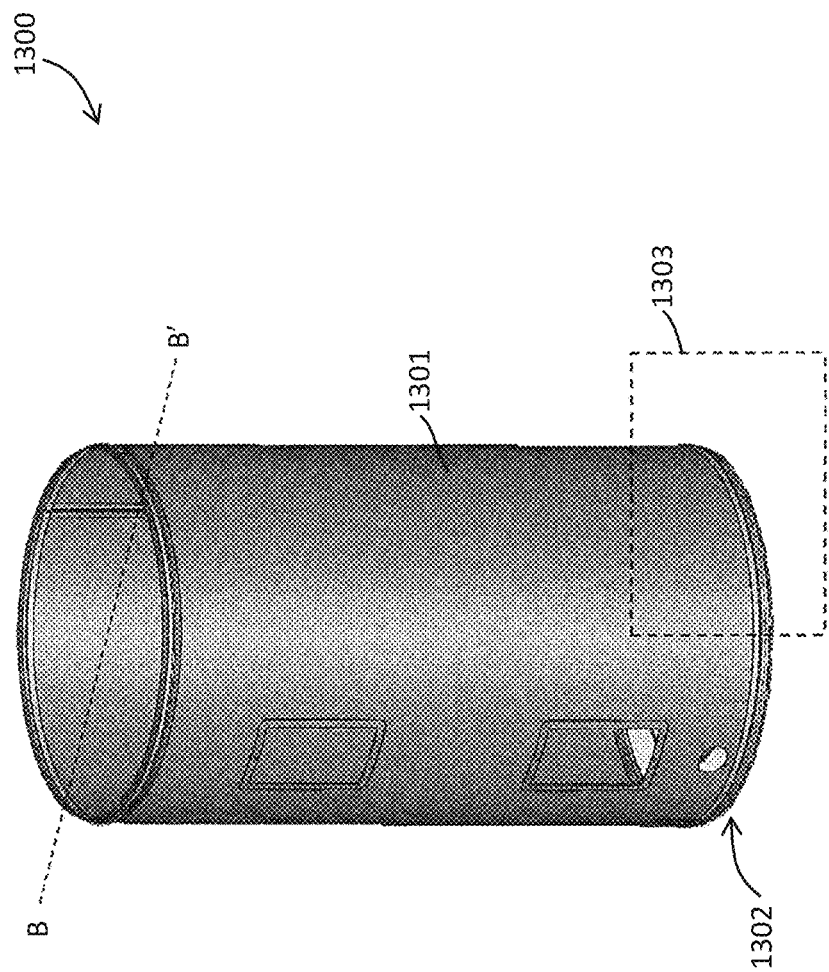
FIG. 13 illustrates a water heater with another example integrated leak detection system, in accordance with example embodiments of the present disclosure.

As illustrated in FIGS. 4 and 12, at least a portion of the sensor assembly (e.g., the wicking tube 1000 and a portion of the sensing segment of the leak sensor 206 disposed in the wicking tube 1000) may be housed in the curved housing section 610 of the sensor bracket 202 and disposed within the continuous channel 1206 defined by the curved housing section 610 and the bottom pan 402. A remainder portion of the leak sensor 206 including the connector 306 may extend out from the continuous channel 1206, via one of the plurality of through holes 404 in the curved housing section 610 of the sensor bracket 202, for connecting to the connector receptacle 302.

Further, in one or more example embodiments, the water that leaks from the water heater 100 may enter the continuous channel 1206 and reach the portion of the sensor assembly that is disposed therein via the plurality of through slots 404 and/or 614 of the curved housing section 610 of the sensor bracket 202.

For example, water that leaks from the bottom surface of the storage tank of the water heater 100 may exit the bottom pan 402 through one or more of the plurality of through holes 502 in the base 504 of the bottom pan 402. Further, the water may move in the narrow gap between the underside of the bottom pan 402 and the mounting surface (e.g., the floor) towards the continuous channel 1206. Water may enter the continuous channel 1206 through the plurality of though slots 614 formed in the bottom portion 904 of the curved housing section 610 and/or a gap between the bottom pan 402 and the curved housing section 610 of the sensor bracket 202. Alternatively, in some examples where the plurality of through slots 614 are formed in the bottom pan 402, the water that collects in the bottom pan 402 exits directly into the continuous channel 1206 and reaches the sensor assembly disposed therein through the plurality of through slots 614 in the bottom pan 402.

In another example, water that leaks from the storage tank of the water heater 100 into a cavity between the storage tank and the outer jacket 101 of the water heater 100 may exit the cavity and enter into the continuous channel 1206 via a gap that may exist between the sidewall 602 of the sensor bracket 202 and the sidewall 506 of the bottom pan 402. However, if water is unable to travel between the sensor bracket 202 and the bottom pan 402 due to sufficient pressure causing a seal, water will collect in the upper lip 608 until it spills down the outer surface of the sensor bracket 202. Water spilling down the outer surface of the sensor bracket 202 may enter the continuous channel 1206 and reach the sensor assembly via the plurality of through slots 404 formed in the top portion of the curved housing section 610 of the sensor bracket 202.

In yet another example, water that leaks from fittings or couplings of the water heater 100 onto an outer surface of the outer jacket 101 surrounding the storage tank of the water heater 100 may flow over the outer surface of the sensor bracket 202 and reach the sensor assembly via the plurality of through slots 404 formed in the top portion of the curved housing section 610 of the sensor bracket 202.

Even though the example embodiment disclosed above describes a leak detection system 102 having a sensor bracket 202 that is coupled to the bottom pan 402 of the water heater 100 such that they define a continuous channel 1206 for housing a sensor assembly, one or ordinary skill in the art can understand and appreciate that in other example embodiments, the sensor bracket may be disposed at any other appropriate portion of the water heater that is suitable for detecting a water leak from the water heater such that the sensor bracket forms a continuous channel that extends circumferentially around the water heater at the portion of the water heater. In some example embodiments, the channel may not be continuous. Further, in some example embodiments, the sensor assembly may not include the wicking material. Instead, the leak sensor that is long enough to extend circumferentially around the water heater may be used and disposed within the channel defined by the sensor bracket. Furthermore, in some example embodiments, the channel may not extend all the way around the water heater. Instead, the channel may only extend partially around the circumference of the water heater. Other example embodiments of the leak detection system that do not include the sensor bracket are also within the broader scope of the present disclosure. For example, a leak detection system may include a bottom pan having a channel that is built into the bottom pan to house the sensor assembly as illustrated in FIGS. 13-19. The leak detection system of FIGS. 13-19 is described below in greater detail.

Water Heater with a Leak Detection System that is Integrated into a Bottom Pan

Turning to FIGS. 13-19, an example water heater 1300 may include a storage tank (not shown) and an outer jacket 1301 that is disposed around the storage tank. Further, the water heater 1300 may include a leak detection system 1302 that is configured to detect water (or any appropriate fluid) that leaks from the water heater 100 (e.g., the storage tank of the water heater 100). The leak detection system 1302 includes a bottom pan 1402 of the water heater 100 and the sensor assembly, where at least a portion of the sensor assembly is disposed in a continuous channel 1410 that is built into or integrated with the bottom pan 1402.

In particular, the bottom pan 1402 includes a base 1404, and a sidewall 1403 that extends substantially perpendicular to the base 1404 from a perimeter of the base 1404. The base 1404 and the sidewall 1403 of the bottom pan 1402 are arranged such that they define an inner cavity 1405 that is configured to receive and support the storage tank and the outer jacket 1301 of the water heater 100 therein. Further, the base 1404 of the bottom pan 1402 may include a through hole 1407 that may be used to hang the bottom pan 1402 during installation and/or to provide an exit path for the water that leaks into and collects in the bottom pan 1402. Additionally, the bottom pan 1402 may include a plurality of through slots 1602 that are formed therein. In particular, the plurality of through slots 1602 may be formed in a portion of the bottom pan 1402 that receives a front face of the water heater 100 to provide a direct path for the water leaking from the storage tank and collecting in the bottom pan 1402 to the sensor assembly disposed in the continuous channel 1410 that is built into the bottom pan 1402.

Figure 17:
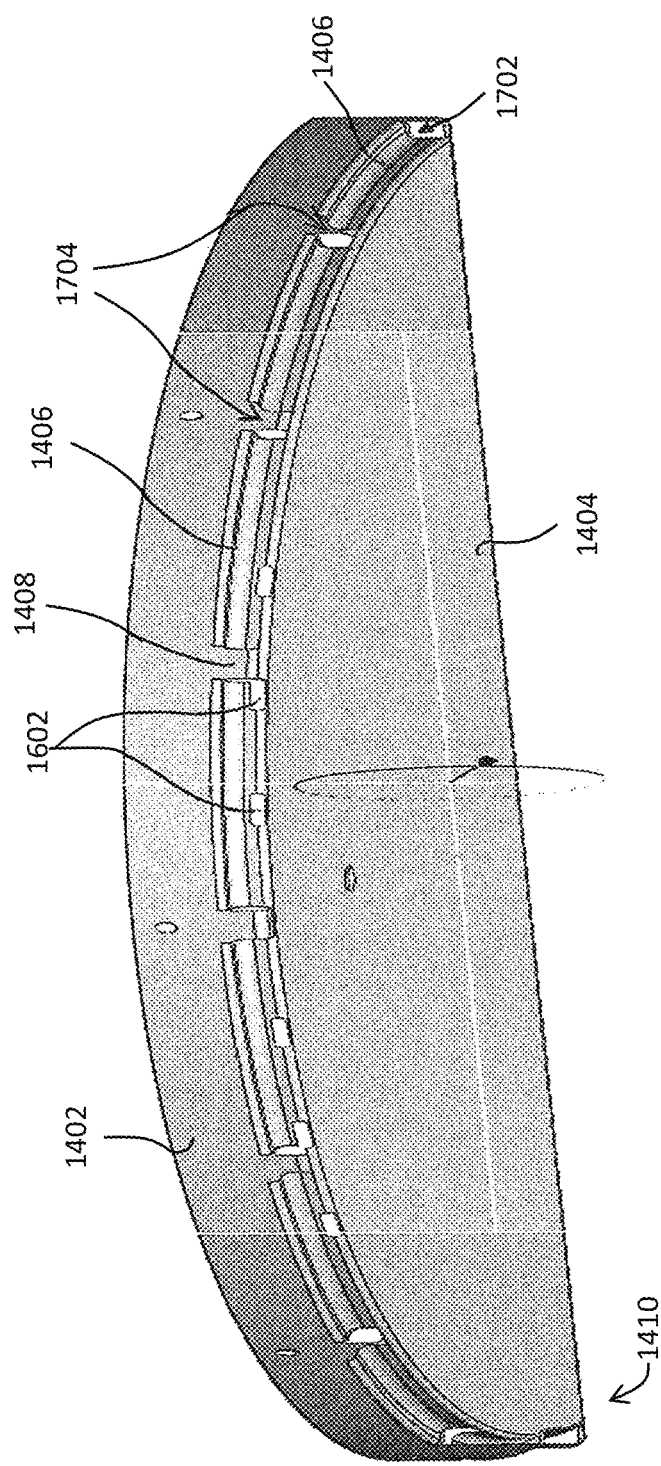
FIG. 17 illustrates a cross-sectional view of the bottom pan of the other example leak detection system taken along a C-C' axis shown in FIG. 15, in accordance with example embodiments of the present disclosure.

Furthermore, the bottom pan 1402 may include a plurality of protrusions 1406 that are defined by portions of the sidewall 1403 that project inward towards the inner cavity 1405. The bottom pan 1402 also includes a plurality of separator tabs 1408 that are formed by portions of the sidewall 1402 that do not project inward towards the inner cavity 1405. As illustrated in FIGS. 14-17, the plurality of protrusions 1406 and the plurality of separator tabs 1408 are arranged such that each adjacent pair of protrusions 1406 are separated by a separator tab 1408. Further, the plurality of protrusions 1406 and the plurality of separator tabs 1408 are arranged such that they jointly define the continuous channel 1410 within the bottom pan 1402 along a bottom edge 1419 of the bottom pan 1402, where the continuous channel 1410 is configured to house at least a portion of the sensor assembly. As illustrated in FIG. 17, the plurality of protrusions 1406 define first segment portions 1702 of the continuous channel 1410, while the plurality of separator tabs 1408 define second segment portions 1704 of the continuous channel 1410. In particular, the first segment portions 1702 of the continuous channel 1410 are open on an outer facing side 1431 (shown in FIG. 15) of the bottom pan 1402, while the second segment portions 1704 of the continuous channel 1410 are open on an inner facing side 1429 of the bottom pan 1402. In other words, the first segment portions 1702 of the continuous channel 1410 are open in a direction away from the inner cavity 1405 and are closed to the inner cavity 1405, while the second segment portions 1704 are open in the direction of the inner cavity 1405 and are open towards the inner cavity 1405 defined by the bottom pan 1402.

In the example embodiment illustrated in FIGS. 14-17 and 19, each separator tab 1408 may have an L-shaped cross-sectional profile, while each protrusion 1406 may have an inverted L-shaped cross-sectional profile. However, in other example embodiments, the separator tabs 1408 and the protrusions 1406 may have any other appropriate cross-sectional profile without departing from a broader scope of the present disclosure.

Figure 14:
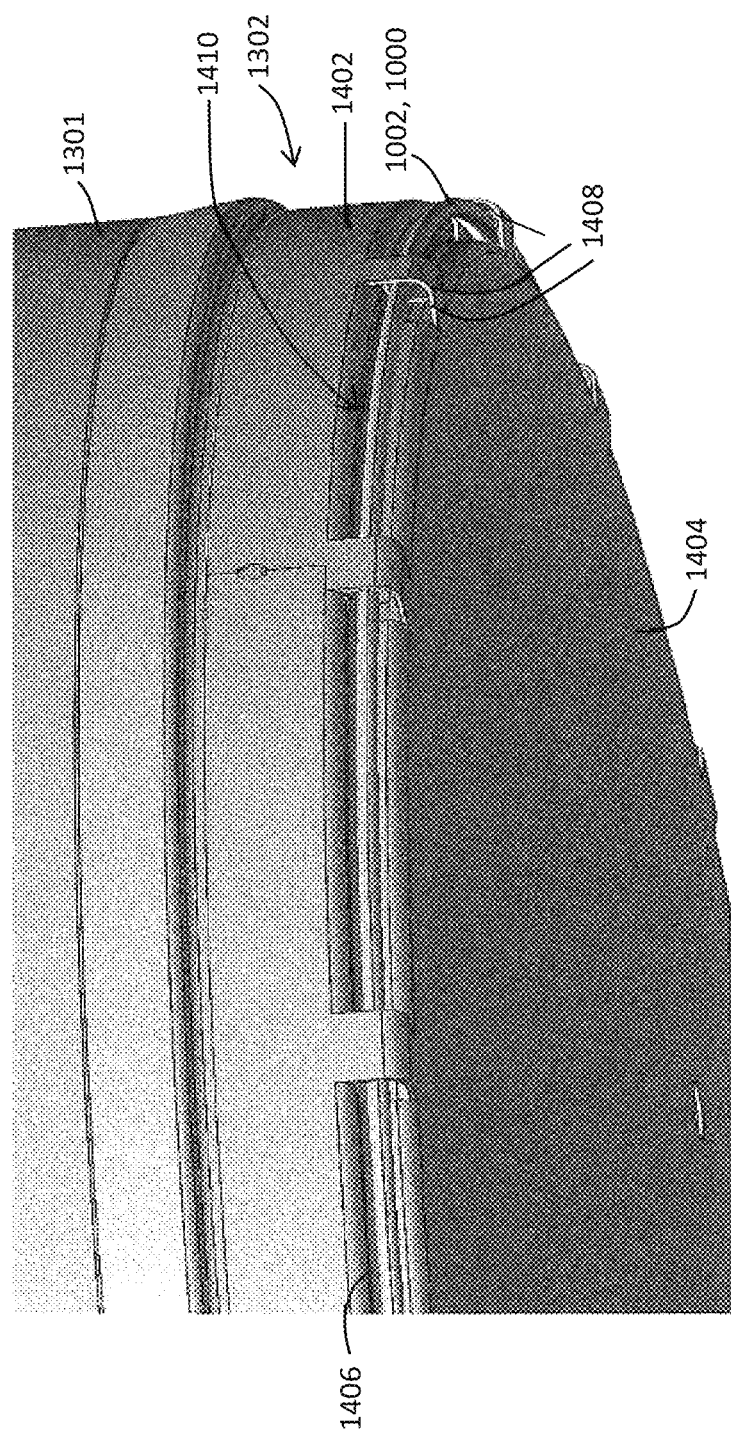
FIG. 14 illustrates an enlarged view of a bottom portion of the water heater of FIG. 13 with the other example leak detection system, in accordance with example embodiments of the present disclosure.
Figure 15:
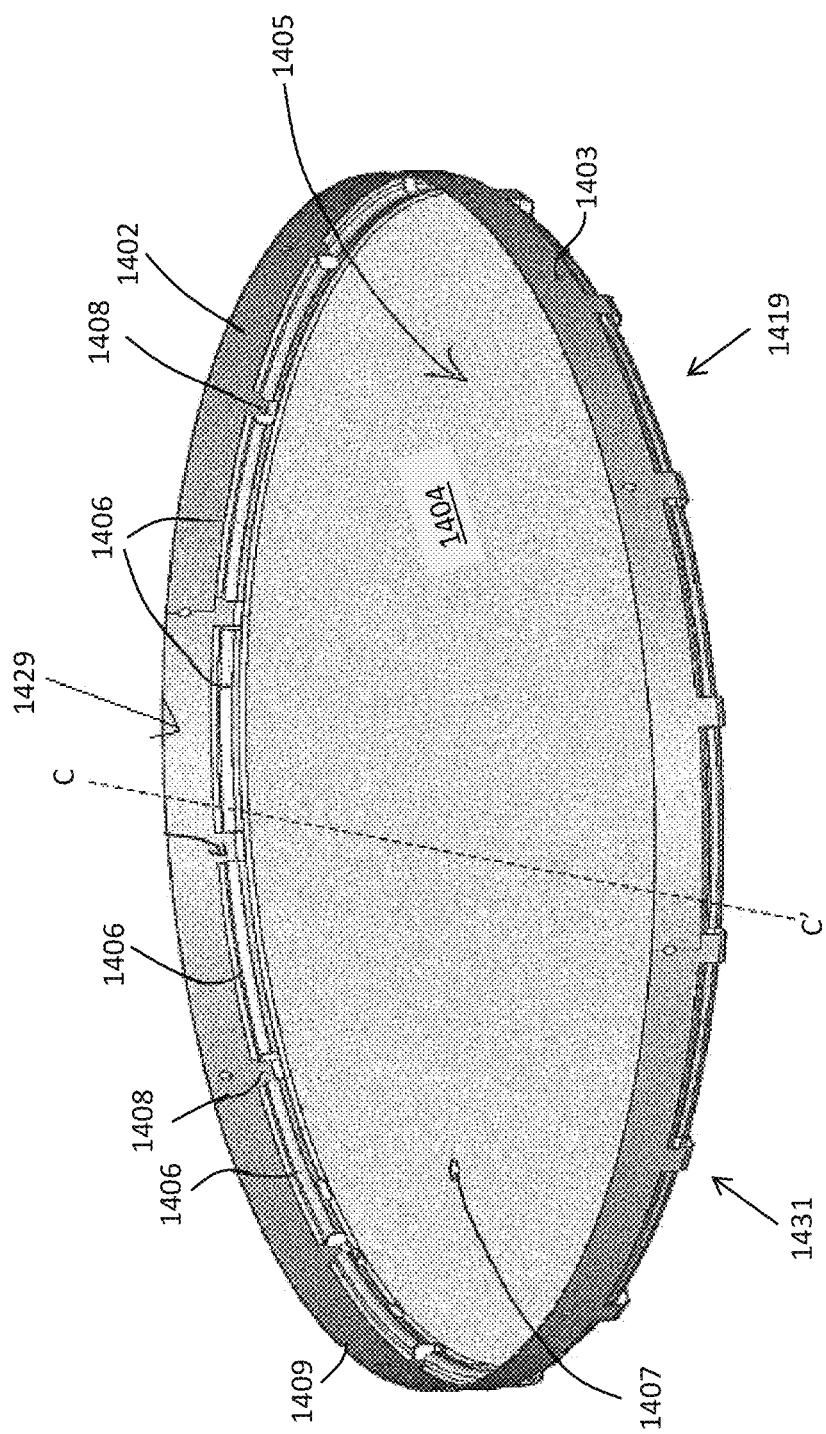
FIG. 15 illustrates a top isometric view of a bottom pan of the other example leak detection system, in accordance with example embodiments of the present disclosure.
Figure 16:
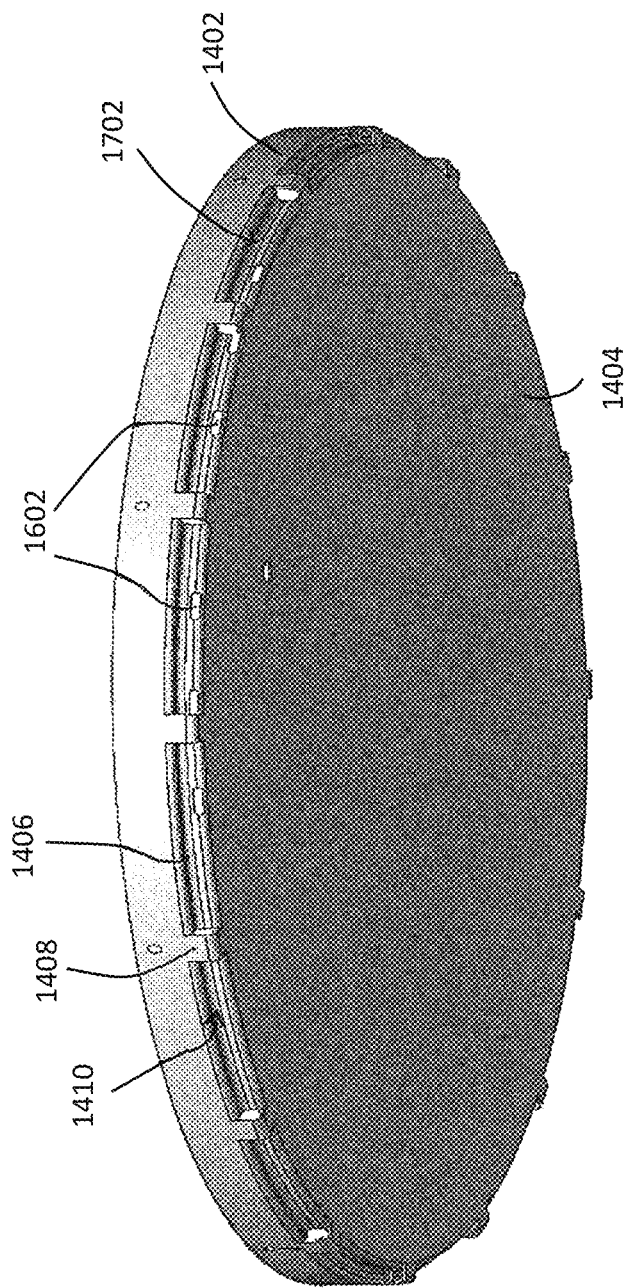
FIG. 16 illustrates a bottom isometric view of the bottom pan of the other example leak detection system, in accordance with example embodiments of the present disclosure.

As illustrated in FIG. 14, a portion of the sensor assembly (e.g., the wicking tube 1000 of the sensor assembly 100 and/or a portion of the leak sensor 206 disposed in the wicking tube 1000) that is disposed in the continuous channel 1410 may be exposed to the external environment and closed to the inner cavity 1405 at the first segment portions 1702, while being closed to the external environment and open to the inner cavity 1405 defined by the bottom pan 1402 in the second segment portions 1704. Accordingly, the continuous channel 1410 and the portion of the sensor assembly disposed therein oscillate or weave between an outer facing side 1431 and an inner facing side 1429 of the bottom pan 1402 along the circumference of the bottom pan 1402. Further, the leak sensor 206 of the sensor assembly exits the continuous channel 1410 through one of the first segment portions 1702 of the continuous channel 1410 to allow a connector 306 of the leak sensor 206 to be coupled to a corresponding connector receptacle disposed on the outer jacket 1301 of the water heater 100.

Figure 18:
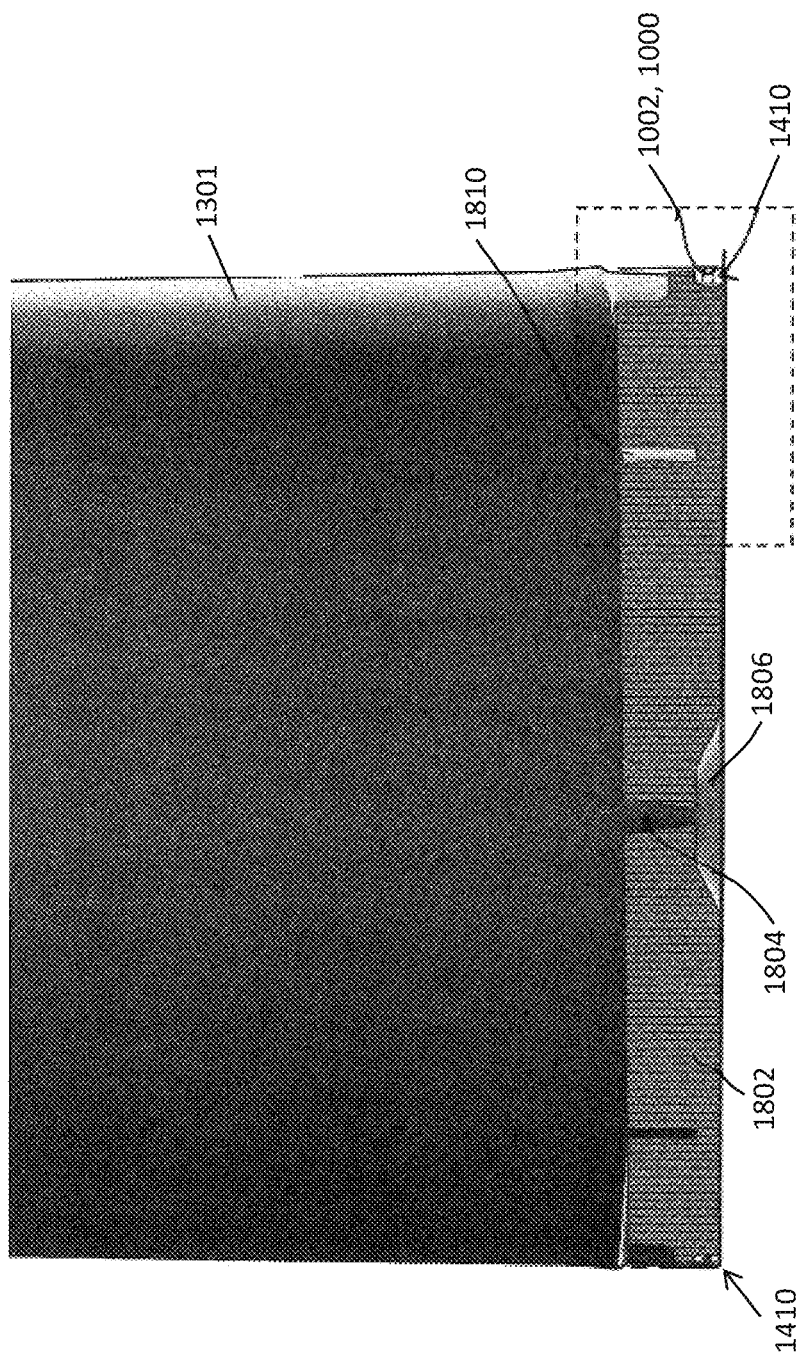
FIG. 18 illustrates a cross-sectional view of a bottom portion of the water heater with the other example integrated leak detection system of FIG. 13 along the B-B' axis, in accordance with example embodiments of the present disclosure.
Figure 19:
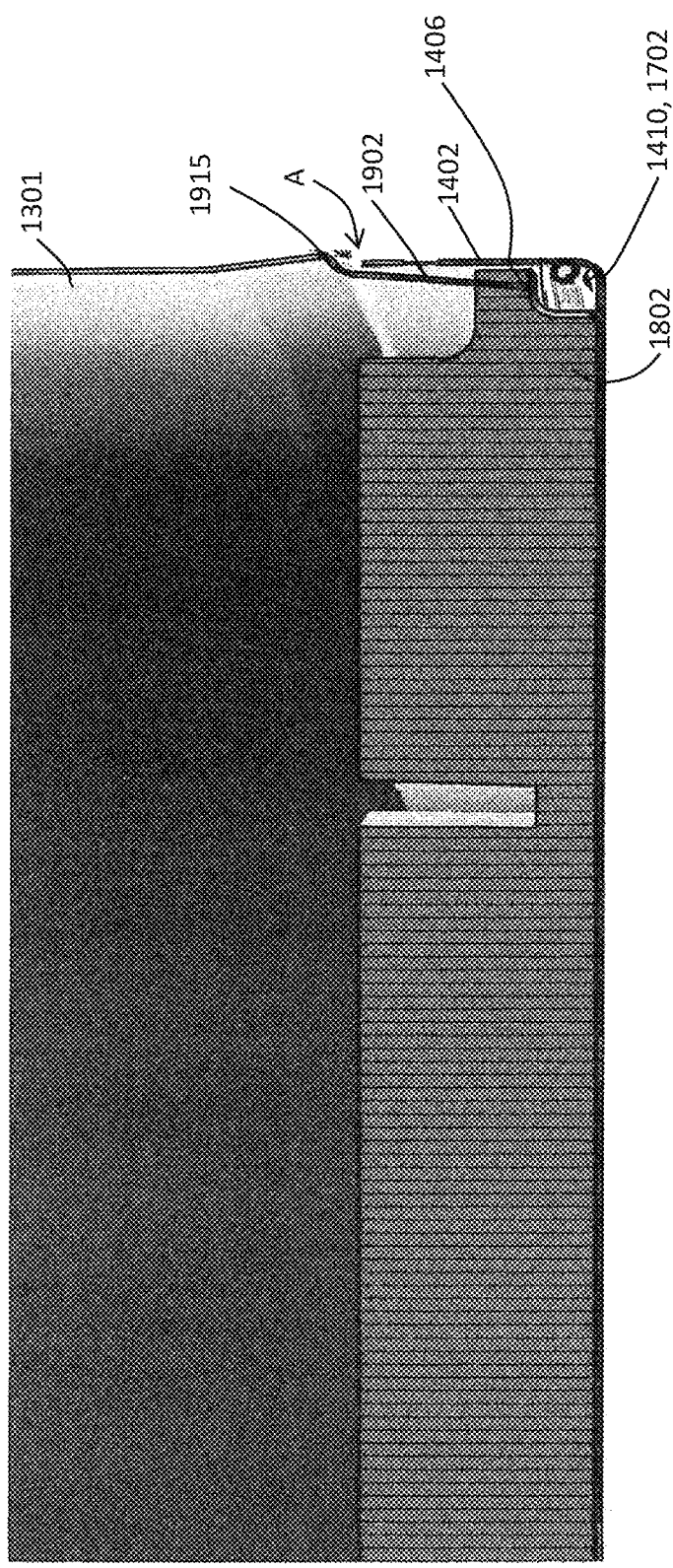
FIG. 19 illustrates an enlarged view of a portion of the cross-section of the water heater with the other example leak detection system, in accordance with example embodiments of the present disclosure.

In one or more example embodiments, the water that leaks from the water heater 100 may enter the continuous channel 1410 and reach the wicking tube 1000 and/or a portion of the leak sensor 206 of the sensor assembly that is disposed therein via the first segment portions 1702 and/or the second segment portions 1704 of the continuous channel 1410. For example, the water that leaks onto the outer surface of the outer jacket 1301 from joints or couplings in the outer jacket 1301 may enter the continuous channel 1410 and the sensor assembly disposed therein through the first segment portions 1702 of the continuous channel 1410. Alternatively, the water may enter the continuous channel 1410 through the second segment portions 1704 of the continuous channel 1410 via path A, i.e., a gap between the lip 1915 of the outer jacket 1301 and the top edge 1409 of the bottom pan 1402, as illustrated in FIG. 19. In particular, as illustrated in FIGS. 18 and 19, the outer jacket 1301 of the water heater 1300 may include the bottom lip 1915 that is formed adjacent a bottom edge 1917 of the outer jacket 1301, and a foot 1902 that extends down from the bottom lip 1915 to the bottom edge 1917. The bottom lip 1915 of the outer jacket 1301 may rest on the top edge 1409 (shown in FIG. 15) of the bottom pan 1402 while the foot 1902 of the outer jacket 1301 extends into the inner cavity 1405 and engages the bottom head insulation pad 1802 disposed therein. The bottom head insulation pad 1802 provides a surface for the outer jacket 1301 to bite into as shown in FIGS. 18 and 19.

In another example, the water that leaks from the bottom surface of the storage tank may enter the cavity 1806 between the bottom head insulation pad 1802 and the base 1404 of the bottom pan 1402 through the opening 1804 that is formed in the bottom head insulation pad 1802. As illustrated in FIGS. 18 and 19, the storage tank may be disposed on the bottom head insulation pad 1802 that is placed in the inner cavity 1405 of the bottom pan 1402, where the bottom head insulation pad 1802 acts as an insulating layer between a bottom surface of the storage tank and the base 1404 of the bottom pan 1402. In some examples, the bottom head insulation pad 1802 may include an annular notch 1810 that is formed therein to receive a bottom edge of the storage tank. However, in another example embodiment, the bottom surface of the storage tank may be directly disposed on the base 1404 of the bottom pan 402. In either case, the water that collects in the bottom pan 1404 may move towards the continuous channel 1410 and enter the continuous channel 1410 via the second segment portions 1704 of the continuous channel 1410. Alternatively, the water that collects in the cavity 1806 may exit the bottom pan 1402 through the through hole 1407 in the base 1404 and move in the gap between the underside of the base 1404 and the mounting surface (e.g., the floor) towards the continuous channel 1410. The water can then enter the continuous channel through the first segment portions 1702 of the continuous channel 1410.

Figure 20:
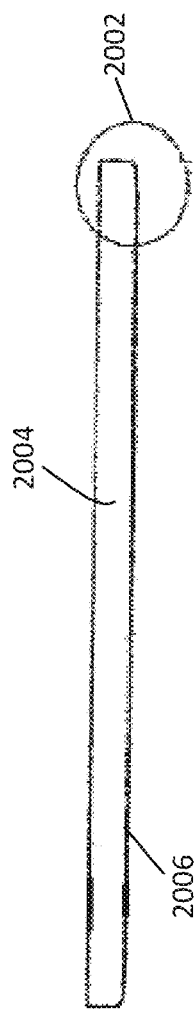
FIG. 20 illustrates a cross-sectional view of another example bottom pan of the water heater, in accordance with example embodiments of the present disclosure.
Figure 21:
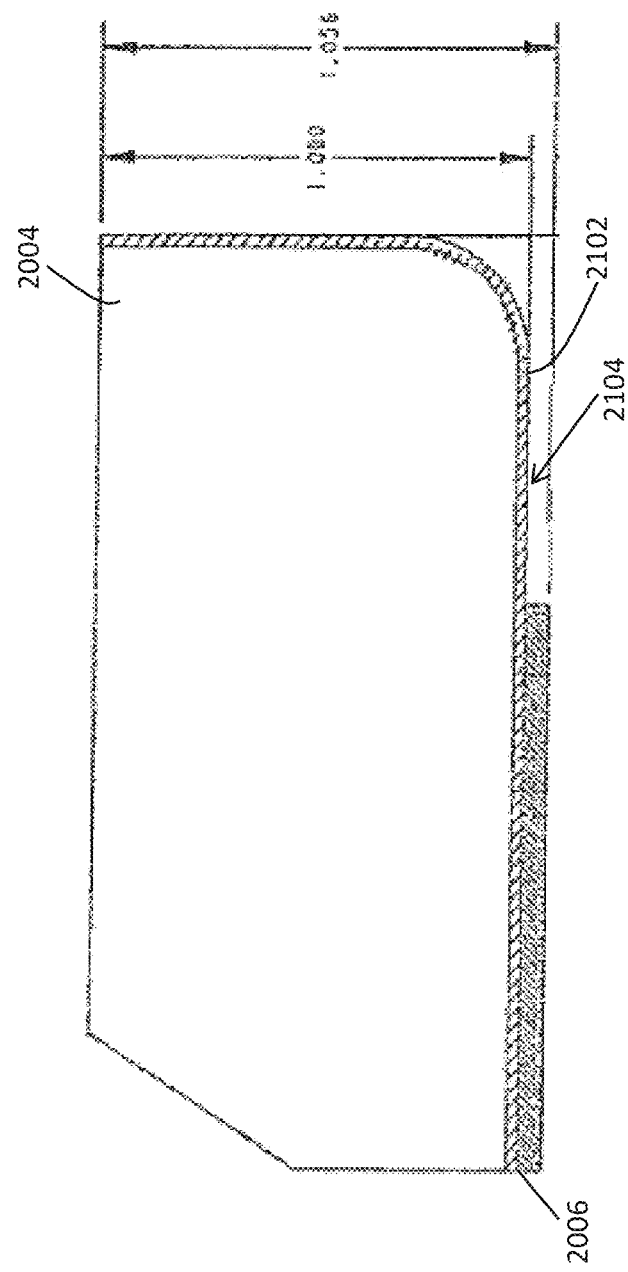
FIG. 21 illustrates an enlarged view of a portion of the cross-section of the other example bottom pan, in accordance with example embodiments of the present disclosure.

In certain example embodiments, the base of the bottom pan may include a built-in feature to aid the transport of the water that exits the bottom pan from the base of the bottom pan towards the continuous channel. For example, as illustrated in FIGS. 20 and 21, a portion 2102 of the base 2006 of the bottom pan 2004 (e.g., adjacent the perimeter of the base 2006) may be raised slightly such that a narrow gap 2104 is created between the mounting surface, such as a floor, and the base 2006 of the bottom pan 2006 when the bottom pan 2004 is disposed on the mounting surface. The narrow gap 2104 may operate as a capillary channel which draws water towards the perimeter of the base and/or the continuous channel through capillary action. The narrow gap 2104 that operates as a capillary channel compensates for gradients in the floor to a certain extent.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A water heater comprising:
   a leak detection system that is integrated with the water heater, the leak detection system comprising:
   a sensor bracket that is coupled to a bottom pan of the water heater such that the sensor bracket defines a channel that extends circumferentially around the bottom pan of the water heater and is disposed between the sensor bracket and the bottom pan, wherein the sensor bracket comprises a plurality of through slots that extends through an outer surface and an inner surface of the sensor bracket and to the channel, such that the through slots provide access to the channel from outside the sensor bracket; and
   a sensor assembly that is configured to detect water that leaks from the water heater, the sensor assembly comprising:
   a leak sensor; and
   a wicking tube that is formed of a wicking material and configured to transport the water towards the leak sensor,
   wherein the wicking tube is wrapped around at least a portion of the leak sensor, and
   wherein the wicking tube is disposed in the channel and extends circumferentially around the water heater.

2. The water heater of claim 1, wherein the sensor bracket comprises:
   an annular sidewall that extends from an upper edge to a lower edge and comprises a plurality of coupling holes;
   an annular lip that extends from the upper edge; and
   a curved housing section that extends from the lower edge.

3. The water heater of claim 2, wherein the plurality of through slots are formed at a top portion of the curved housing section of the sensor bracket.

4. The water heater of claim 2, wherein the annular sidewall of the sensor bracket is coupled to a sidewall of the bottom pan of the water heater using fasteners such that:
   the sensor bracket is disposed circumferentially around the sidewall of the bottom pan, and
   an open end of the curved housing section faces the sidewall of the bottom pan and forms the channel with the sidewall of the bottom pan.

5. The water heater of claim 1, wherein the plurality of through slots provide a path for the water that leaks from the water heater to enter the channel and reach the sensor assembly.

6. The water heater of claim 1, wherein the bottom pan of the water heater is configured to receive and support at least a storage tank and an outer jacket of the water heater.

7. The water heater of claim 4:
   wherein the bottom pan comprises:
   a base; and
   a sidewall that extends from a perimeter of the base,
   wherein the base of the bottom pan comprises a raised portion creating a gap between the raised portion of the base and a mounting surface on which the water heater is disposed, and wherein the gap creates a capillary channel that draws the water along an underside of the bottom pan towards the channel in which the sensor assembly is disposed.

8. The water heater of claim 1, wherein the wicking tube is open such that it has a substantially C-shaped cross-sectional profile.

9. The water heater of claim 1, wherein the leak sensor is a rope sensor that has a sensing segment and a connector disposed at an end of the leak sensor.

10. The water heater of claim 9, wherein the portion of the leak sensor that is disposed in the wicking tube is at least a portion of the sensing segment.

11. A water heater comprising:
a leak detection system that is integrated with the water heater, the leak detection system comprising:
a sensor bracket that is coupled to the water heater such that the sensor bracket defines a channel that extends circumferentially around the water heater,
wherein the sensor bracket comprises a plurality of through slots that provide access to the channel;
a leak sensor that is configured to detect water that leaks from the water heater, wherein the leak sensor is disposed in the channel and extends circumferentially around the water heater;
a shut-off valve that is configured to control a flow of the water into a storage tank of the water heater; and
a controller that is coupled to the leak sensor and configured to control the shut-off valve,
wherein responsive to receiving a signal from the leak sensor that the leak sensor has detected water, the controller is configured to:
close the shut-off valve during a first mode of operation, and
send a query to a computing device that is communicably coupled to the water heater and close the shut-off valve based on an input from the computing device during a second mode of operation.

12. The water heater of claim 11, wherein the first mode of operation comprises receiving the signal from the leak sensor outside of a timeframe, the timeframe representing one of operating hours of a business and a user selected time period.

13. The water heater of claim 11, wherein the second mode of operation comprises receiving the signal from the leak sensor within a timeframe, the timeframe representing one of operating hours of a business and a user selected time period.

14. The water heater of claim 11, wherein the first mode of operation comprises receiving the signal from the leak sensor within a timeframe and the second mode of operation.

15. A water heater comprising:
a leak detection system that is integrated with the water heater, the leak detection system comprising:
a channel that is integrally formed with a bottom pan of the water heater, wherein the channel extends circumferentially around the water heater such that the channel oscillates between an outer facing side and an inner facing side of the bottom pan along a circumference of the bottom pan; and
a sensor assembly that is configured to detect water that leaks from the water heater, the sensor assembly comprising:
a leak sensor; and
a wicking tube that is formed of a wicking material and configured to transport the water towards the leak sensor,
wherein the wicking tube is wrapped around at least a portion of the leak sensor, and
wherein the wicking tube is disposed in the channel and extends circumferentially around the water heater such that the wicking tube oscillates between the outer facing side and the inner facing side of the bottom pan along the circumference of the bottom pan.

16. The water heater of claim 15, wherein the channel extends along a bottom edge of the bottom pan.

17. The water heater of claim 16, wherein the bottom pan comprises:
a base;
a sidewall that extends substantially perpendicular to the base from a perimeter of the base,
wherein the base and the sidewall define an inner cavity of the bottom pan that is configured to receive and support at least a storage tank and an outer jacket of the water heater therein;
a plurality of protrusions that are defined by portions of the sidewall that project inwards towards the inner cavity; and a plurality of separator tabs that are defined by portions of the sidewall that project away from the inner cavity,
wherein the plurality of protrusions and the plurality of separator tabs are arranged such that each adjacent pair of protrusions are separated by a separator tab.

18. The water heater of claim 17, wherein the plurality of protrusions and the plurality of separator tabs jointly define the channel that extends circumferentially along the bottom edge of the bottom pan.

19. The water heater of claim 17:
wherein the channel comprises a plurality of first segment portions and a plurality of second segment portions, and
wherein each first segment portion is defined by a protrusion of the plurality of protrusions and each second segment portion is defined by a separator tab of the plurality of separator tabs.

20. The water heater of claim 19:
wherein each first segment portion is open on the outer facing side of the bottom pan, while each second segment portion is open on the inside facing side of the bottom pan.

* * * * *